US011138596B2

(12) United States Patent
Carpenter et al.

(10) Patent No.: US 11,138,596 B2
(45) Date of Patent: Oct. 5, 2021

(54) METHOD AND SYSTEM FOR TRANSMITTING CREDENTIALS

(71) Applicant: Visa Europe Limited, London (GB)

(72) Inventors: Paul Michael Carpenter, London (GB); Jonathan Paul Sumpster, London (GB); Andrew Paul Thompson, London (GB); Christopher Ian Abrathat, London (GB); Jonathan Rusca, London (GB); Jean-Christophe Gilbert Lacour, London (GB); Michael Ronald Philpotts, London (GB)

(73) Assignee: VISA EUROPE LIMITED, London (GB)

( * ) Notice: Subject to any disclaimer, the term of this patent is extended or adjusted under 35 U.S.C. 154(b) by 521 days.

(21) Appl. No.: 14/883,508

(22) Filed: Oct. 14, 2015

(65) Prior Publication Data

US 2016/0034892 A1 Feb. 4, 2016

Related U.S. Application Data

(63) Continuation of application No. PCT/GB2014/051184, filed on Apr. 15, 2014.

(30) Foreign Application Priority Data

Apr. 15, 2013 (GB) ...................................... 1306834

(51) Int. Cl.
*G06Q 20/38* (2012.01)
*G06Q 20/40* (2012.01)
*H04L 29/06* (2006.01)

(52) U.S. Cl.
CPC ......... *G06Q 20/3821* (2013.01); *G06Q 20/40* (2013.01); *G06Q 20/405* (2013.01); *H04L 63/083* (2013.01)

(58) Field of Classification Search
None
See application file for complete search history.

(56) References Cited

U.S. PATENT DOCUMENTS 5,095,194 A * 3/1992 Barbanell .............. G07C 9/257
235/379
6,092,053 A * 7/2000 Boesch ................ G06Q 10/103
705/26.8

(Continued)

FOREIGN PATENT DOCUMENTS

GB 2466676 A * 7/2010 ............. G06Q 20/40
GB 2466676 A 7/2010

(Continued)

OTHER PUBLICATIONS

International Search Report and Written Opinion dated Jul. 31, 2014 for PCT Application No. PCT/GB2014/051184.

(Continued)

*Primary Examiner* — Jacob C. Coppola
(74) *Attorney, Agent, or Firm* — Kilpatrick Townsend & Stockton LLP

(57) ABSTRACT

Method and apparatus for transmitting credentials to a transaction processing system, the credentials arranged in sets and a set including a unique identifier and verification data elements. Credentials are activated and are then available for use in at least one subsequent transaction. In the transaction, in response to receiving authorization from a user, the unique identifier and verification data elements from a set are transmitted to the transaction processing system for the user. The credentials are activated using an activation mode selected from at least a first activation mode and a second activation mode. In the first activation mode, additional user input for the verification data elements associated with the unique identifier is received from the user. In the second activation mode, the user is authenti- (Continued)

cated, and verification data elements are received via a data communications network are received from a trusted data processing system remote from the user.

20 Claims, 23 Drawing Sheets

(56) References Cited

U.S. PATENT DOCUMENTS

| | | | |
|---|---|---|---|
| 6,609,198 B1* | 8/2003 | Wood | G06F 21/41 713/155 |
| 9,218,624 B2* | 12/2015 | Moghadam | G06Q 20/3567 |
| 2002/0052853 A1* | 5/2002 | Munoz | G06Q 20/027 705/79 |
| 2002/0174016 A1* | 11/2002 | Cuervo | G06Q 20/00 705/16 |
| 2004/0199770 A1* | 10/2004 | Roskind | H04L 63/0815 713/176 |
| 2007/0045406 A1* | 3/2007 | Giesen | G06Q 20/24 235/380 |
| 2009/0193507 A1* | 7/2009 | Ibrahim | H04W 12/0608 726/9 |
| 2009/0300720 A1* | 12/2009 | Guo | H04L 51/12 726/3 |
| 2010/0174620 A1* | 7/2010 | Stringfellow | G06Q 20/227 705/26.1 |
| 2012/0290449 A1* | 11/2012 | Mullen | G06Q 20/3278 705/27.2 |
| 2014/0074655 A1* | 3/2014 | Lim | G06Q 20/387 705/26.35 |
| 2016/0034891 A1 | 2/2016 | Carpenter et al. | |

FOREIGN PATENT DOCUMENTS

| | | | | |
|---|---|---|---|---|
| GB | 2466810 A1 | 7/2010 | | |
| WO | 200159627 A1 | 8/2001 | | |
| WO | 200205231 A2 | 1/2002 | | |
| WO | WO-0205231 A2 * | 1/2002 | | G06Q 20/02 |
| WO | 2008007939 A1 | 1/2008 | | |
| WO | WO-2008007939 A1 * | 1/2008 | | G06Q 20/04 |
| WO | 2008123762 A1 | 10/2008 | | |
| WO | WO-2008123762 A1 * | 10/2008 | | G06Q 20/20 |

OTHER PUBLICATIONS

Nicole Acosta: "Paypal—Adding a Credit Card and Bank Account" YouTube video https://www.youtube.com/watch?v=0JoR8ue8-6M (Jun. 23, 2011).

Wikipedia "Paypal" article (Apr. 13, 2013) http://en.wikipedia.org/w/index.php?title=PayPal&oldid=550228323 section on "Payment sources and destinations".

* cited by examiner

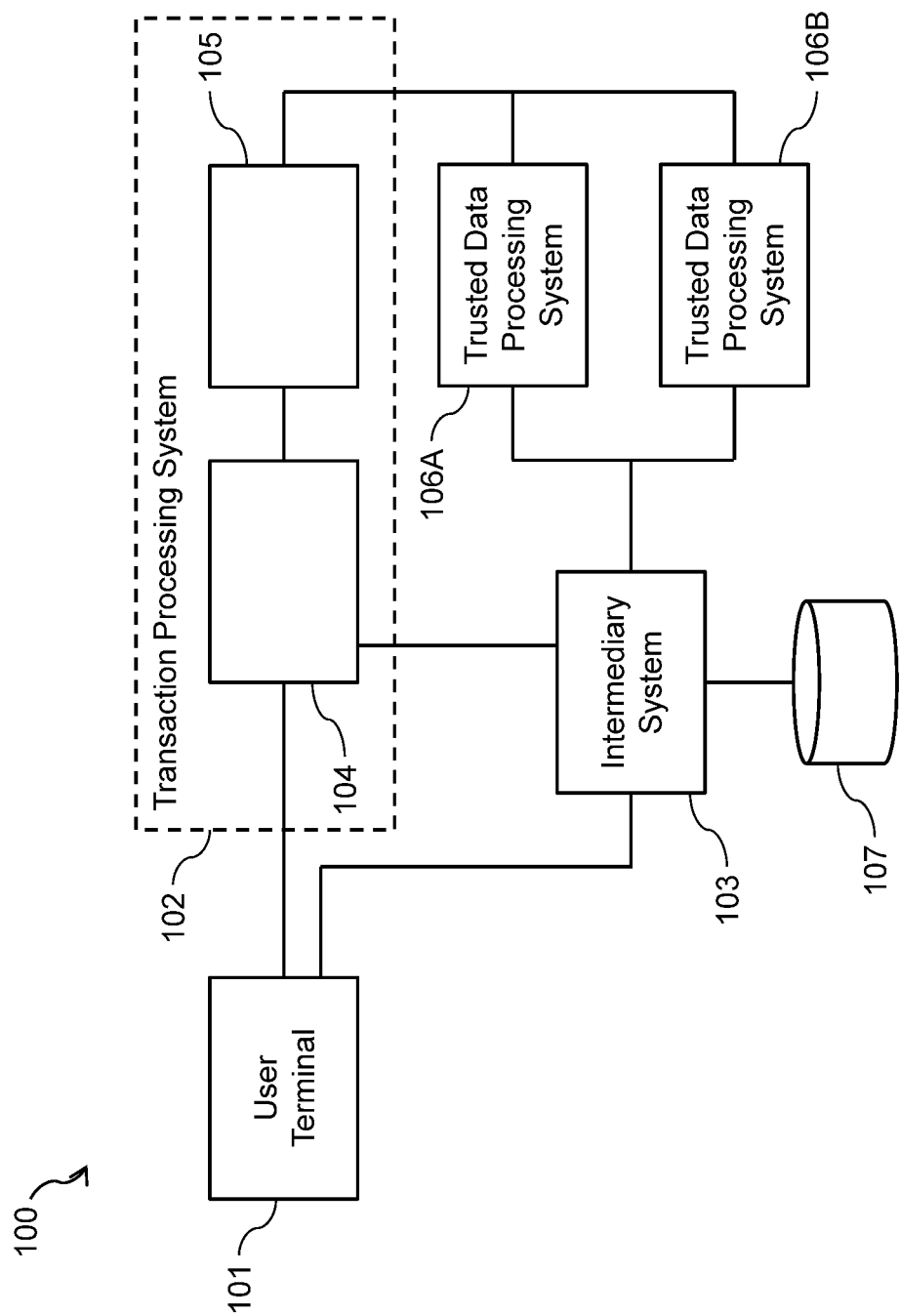

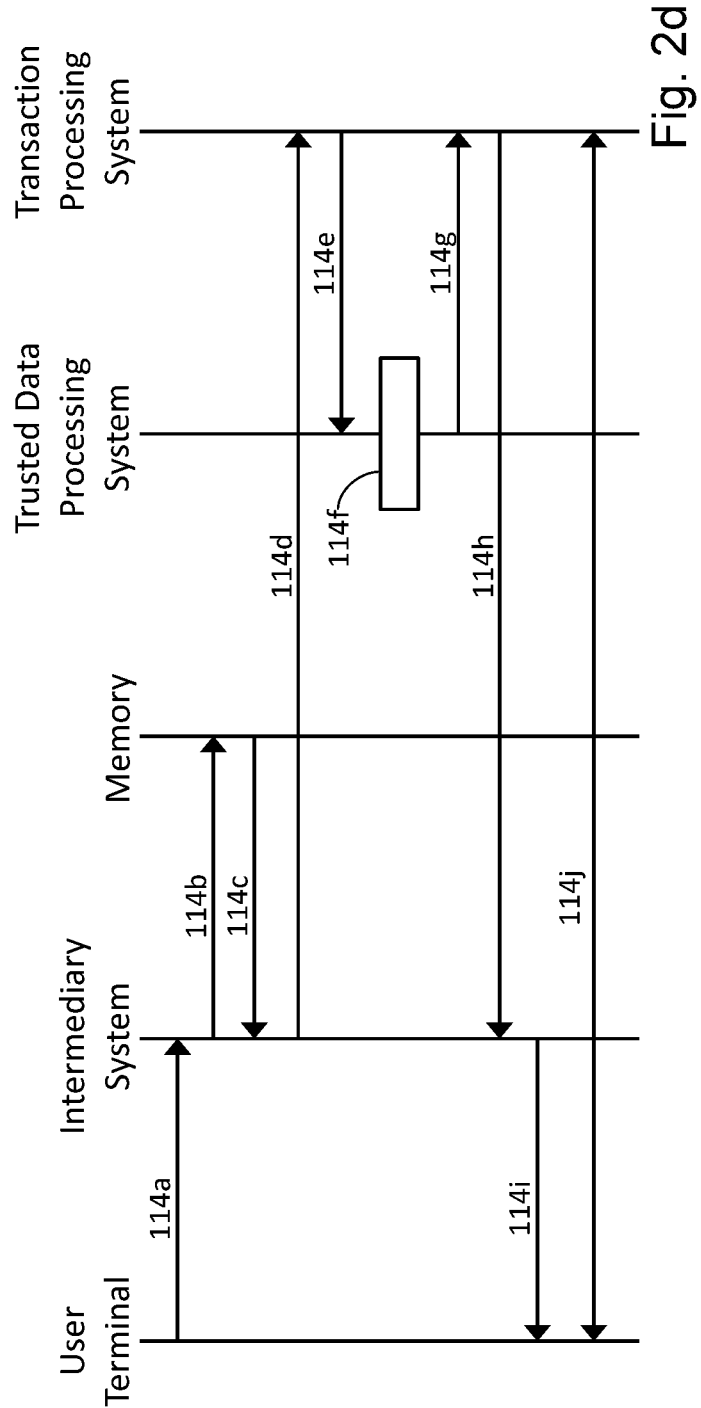

Enter the details of your card

Card Number
Cardholder Name
Expiry Date
Security Number

Billing Address:

Address line 1
Address line 2
City/Town
County
Post Code

Activation Complete

XXXX XXXX XXXX 1234
Mr AN Other   Exp 01/01

Back to Homepage

METHOD AND SYSTEM FOR TRANSMITTING CREDENTIALS

CROSS-REFERENCE TO RELATED APPLICATIONS

This application is a continuation of International Application No. PCT/GB2014/051184, filed Apr. 15, 2014, which claims the benefit of Foreign Application No. GB 1306834.1, filed Apr. 15, 2013. Each of the above-referenced patent applications is incorporated by reference in its entirety.

BACKGROUND OF THE INVENTION

Field of the Invention

The present invention relates to a system and method for transmitting credentials to a transaction processing system, and in particular to the activation of credentials prior to the transmitting.

Description of the Related Technology

In transaction processing systems, credentials are required to effect transactions involving, for example, a user terminal. These credentials are provided by the user terminal, or by a user thereof, to the transaction processing system and are subsequently used for authentication and/or authorization during the transaction.

Typically the credentials comprise a unique identifier, which may be, for example, one or a combination of a device identity of the user terminal, a username, email address, an account number or the like. The unique identifier is used to distinguish the user terminal, or the user using the terminal, from other entities which may be making transactions. In other words, the unique identifier ensures that the transaction can be attributed to the correct party.

In addition to the unique identifier, one or more verification data elements may be provided by the user terminal to the transaction processing system to effect the transaction. These verification data elements may include passwords or other secret information known only to the user or user terminal, complex alphanumeric strings which may be generated using signing or hash functions, or ancillary information such as a name and/or address.

Providing these credentials can be laborious and can allow errors to be made. Therefore, there is a desire for improvements in the transmitting of credentials for such transaction processing systems.

SUMMARY

In accordance with at least one embodiment, methods, devices, systems and software are provided for supporting or implementing functionality to transmit credentials.

This is achieved by a combination of features recited in each independent claim. Accordingly, dependent claims prescribe further detailed implementations of various embodiments.

According to a first embodiment there is provided apparatus for transmitting credentials to a transaction processing system via a data communications network, the credentials being arranged in sets of credentials, a set of credentials including a unique identifier and one or more verification data elements associated with the unique identifier, the apparatus being configured to activate a set of credentials and, after activation, make the set of credentials available for use in at least one subsequent transaction, during which, in response to receiving authorization from a user, the apparatus transmits, from the set of credentials, the unique identifier and at least one of the one or more verification data elements to the transaction processing system on behalf of the user, wherein the apparatus is configured to activate a set of credentials using an activation mode selected from at least a first activation mode and a second activation mode, each of the first and second activation modes including receiving data from a user via a data communications network, wherein the apparatus is configured to request and receive user input for a unique identifier from the user, wherein in the first activation mode, the apparatus is configured to: request and receive additional user input for the one or more verification data elements associated with the unique identifier from the user; and responsive to the user input, activate a set of credentials including the input unique identifier and the input one or more verification data elements associated with the unique identifier, and wherein, in the second activation mode, the apparatus is configured to: initiate an authentication process for the user; and responsive to the user successfully authenticating during the authentication process, activate a set of credentials including the input unique identifier and one or more verification data elements associated with the unique identifier, wherein the one or more verification data elements are received via a data communications network from a trusted data processing system remote from the user.

According to a second embodiment there is provided apparatus for transmitting credentials to a transaction processing system via a data communications network, the credentials being arranged in sets of credentials, a set of credentials including a unique identifier and one or more verification data elements associated with the unique identifier, the apparatus being configured to activate a set of credentials and, after activation, make the set of credentials available for use in at least one subsequent transaction, during which, in response to receiving authorization from a user, the apparatus transmits, from the set of credentials, the unique identifier and at least one of the one or more verification data elements to the transaction processing system, and wherein the apparatus is configured to activate a set of credentials using an activation process including receiving data from a user via a data communications network, wherein during the activation process the apparatus is configured to: request user input for a unique identifier from the user, initiate an authentication process for the user; and responsive to the user successfully authenticating during the authentication process, activate a set of credentials including the input unique identifier and one or more verification data elements associated with the unique identifier, wherein the one or more verification data elements are received via the data communications network from a trusted data processing system remote from the user.

According to a third embodiment there is provided a method of activating a set of credentials for transmission to a transaction processing system via a data communications network, the credentials being arranged in sets of credentials, a set of credentials including a unique identifier and one or more verification data elements associated with the unique identifier, wherein, after activation, the set of credentials are made available for use in at least one subsequent transaction during which, in response to receiving authorization from a user, the unique identifier and at least one of the one or more verification data elements from the set of credentials are transmitted to the transaction processing system, wherein the activation of a set of credentials comprises using an activation mode selected from at least a first activation mode and a second activation mode, each of the first and second activation modes including receiving data from a user via a data communications network, wherein the method comprises: requesting user input for a unique identifier from the user, and wherein, in the first activation mode, the method comprises: requesting additional user input for the one or more verification data elements associated with the unique identifier from the user; and responsive to the user input, activating a set of credentials including the input unique identifier and the input one or more verification data elements associated with the unique identifier, and wherein, in the second activation mode, the method comprises: initiating an authentication process for the user; and responsive to the user successfully authenticating during the authentication process, activating a set of credentials including the input unique identifier and one or more verification data elements associated with the unique identifier, wherein in the case of using the second activation mode, the one or more verification data elements are received via the data communications network from a trusted data processing system remote from the user.

According to a fourth embodiment there is provided a computer program arranged to perform a method of activating a set of credentials for transmission to a transaction processing system via a data communications network, the credentials being arranged in sets of credentials, a set of credentials including a unique identifier and one or more verification data elements associated with the unique identifier, wherein, after activation, the set of credentials are made available for use in at least one subsequent transaction during which, in response to receiving authorization from a user, the unique identifier and at least one of the one or more verification data elements from the set of credentials are transmitted to the transaction processing system, wherein the activation of a set of credentials comprises using an activation mode selected from at least a first activation mode and a second activation mode, each of the first and second activation modes including receiving data from a user via a data communications network, wherein the method comprises: requesting user input for a unique identifier from the user, and wherein, in the first activation mode, the method comprises: requesting additional user input for the one or more verification data elements associated with the unique identifier from the user; and responsive to the user input, activating a set of credentials including the input unique identifier and the input one or more verification data elements associated with the unique identifier, and wherein, in the second activation mode, the method comprises: initiating an authentication process for the user; and responsive to the user successfully authenticating during the authentication process, activating a set of credentials including the input unique identifier and one or more verification data elements associated with the unique identifier, wherein in the case of using the second activation mode, the one or more verification data elements are received via the data communications network from a trusted data processing system remote from the user.

According to a fifth embodiment there is provided a method for use in activating credentials at a remote data processing system via a data communications network, the credentials being arranged in sets of credentials, a set of credentials including a unique identifier and one or more verification data elements associated with the unique identifier, wherein, after activation, the set of credentials are made available for use in at least one subsequent transaction during which, in response to receiving authorization from a user, the unique identifier and at least one of the one or more verification data elements from the set of credentials are transmitted from the remote data processing system to a transaction processing system, wherein the set of credentials are activated using an activation mode selected from at least a first activation mode and a second activation mode, each of the first and second activation modes including receiving data from a user and transmitting the received data to the remote data processing system via the data communications network, wherein the method comprises receiving user input for a unique identifier from the user, wherein in the first activation mode, the method comprises: requesting and receiving additional user input for the one or more verification data elements associated with the unique identifier from the user; and responsive to the user input, transmitting a set of credentials including the input unique identifier and the input one or more verification data elements associated with the unique identifier to the remote system whereby to enable the activation of the set of credentials, and wherein, in the second activation mode, the method comprises: conducting an authentication process for the user whereby to authorize the activation of a set of credentials including the input unique identifier and one or more verification data elements associated with the unique identifier, wherein the one or more verification data elements are received at the remote data processing system via a data communications network from a trusted data processing system remote from the user.

Further features and advantages will become apparent from the following description of embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which:

FIG. 1 is a schematic diagram showing a data communications network in accordance with embodiments;

FIGS. 2a, 2b, 2c and 2d are schematic flow diagrams showing the flow of data within the data communications network in accordance with embodiments;

FIGS. 9a, 9b, 9c, 9d and 9e show representations of content displayed to a user during the process shown in FIG. 8;

FIGS. 11a, 11b, 11c and 11d show representations of content displayed to a user during the process shown in FIG. 10;

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 2A:
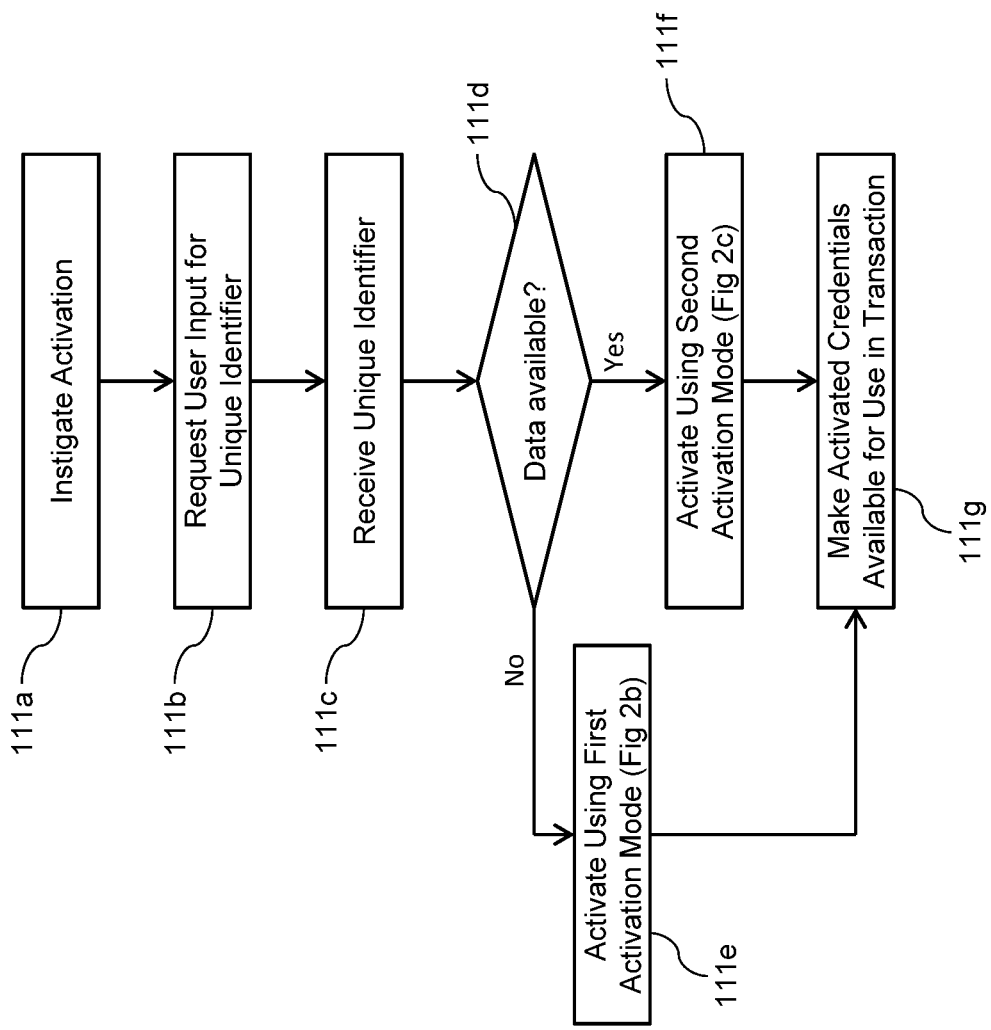

Embodiments are applicable to many types of transaction systems. Accordingly FIGS. 1 and 2 will be used to illustrate an embodiment in a generalized transaction system. Following on from this, FIGS. 3 to 14 will be used to illustrate embodiments in a payment processing system.

FIG. 1 shows a data communications network 100 within which embodiments may be practiced. In the data communications network 100, a user terminal 101 may conduct one or more transactions. The user terminal 101 may comprise, for example, a personal computer, a tablet computer device, a smartphone, smart TV or other Internet-connected device. The user terminal 101 may be equipped with a browser which allows the user to access an online transaction processing system. The user terminal 101 may be associated with a user, operating the user terminal 101, as such, authentication steps described below may comprise authentication of the user, via the user terminal 101.

To enable these transactions to be conducted, the user terminal 101 is connected, via the data communications network 100, to a transaction processing system 102. The user terminal 101 is also connected to an intermediary system 103. The intermediary system 103 is in turn connected to both the user terminal 101 and the transaction processing system 102. The transaction processing system 102 may itself contain one or more transaction processing nodes, shown here as nodes 104 and 105.

In addition, data communications network 100 contains one or more trusted data processing systems 106, shown here as trusted data processing systems 106A and 106B. These trusted data processing systems may be connected both to the transaction processing system 102 and to the intermediary system 103. The trusted data processing systems 106 are remote from the user terminal 101 and therefore remote from any user of the user terminal. The intermediary system 103 may contain or, as shown, be connected to, a store or memory 107 such as a database. The trusted data processing systems 106 may themselves contain one or more network nodes (not shown). While shown separately, the trusted data processing systems may form a part of, or be otherwise associated with, the transaction processing system 102.

The use of the data communications network 100 and the elements therein will now be described, according to an embodiment, with reference to FIGS. 2a, 2b and 2c. In this embodiment, the intermediary system 103 transmits credentials to the transaction processing system 102 via the data communications network 100 on behalf of the user terminal 101 or the user thereof.

The credentials are arranged in sets of credentials. These sets include a unique identifier and one or more verification data elements associated with the unique identifier. The unique identifier may be, for example, one or a combination of a device identity of the user terminal, a username, email address, an account number or the like. The verification data elements may include passwords or other secret information known only to the user or user terminal, complex alphanumeric strings which may be generated using signing or hash functions, or ancillary information such as a name and/or address.

The intermediary system 103 is configured to activate these sets of credentials. After activation, the set of credentials are then made available for use in subsequent transactions. During these transactions, in response to receiving authorization from a user, the apparatus transmits, from the relevant set of credentials, the unique identifier and at least one of the one or more verification data elements to the transaction processing system on behalf of the user. In other words, the intermediary system 103 provides the credentials on behalf of the user.

To activate a set of credentials, the intermediary system 103 uses an activation mode selected from at least a first activation mode and a second activation mode. As will be shown, both the first and second activation modes include receiving data from a user via a data communications network.

Figure 2B:
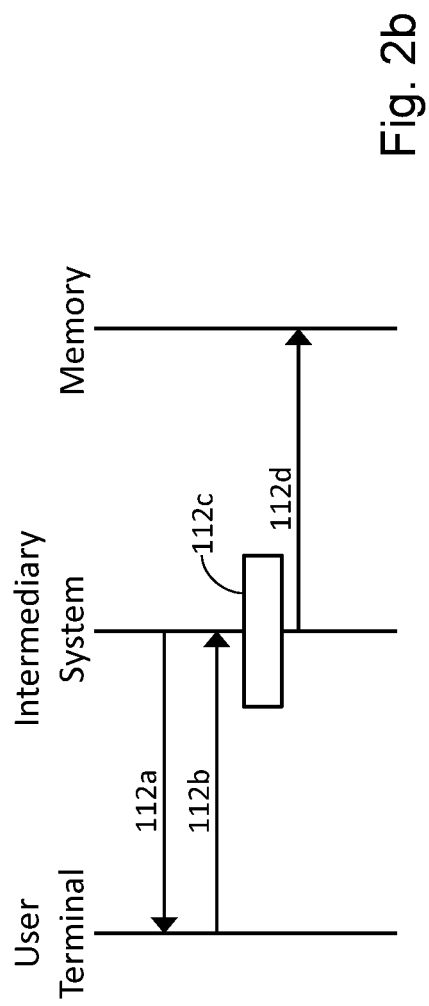

An overview of the process for activating credentials is shown in FIG. 2a. In a first step 111a, the activation process is instigated. This step may, for example, include the intermediary system 103 receiving a request from the user terminal 101, such as when a user accesses a webpage provided by the intermediary system 103. However, this is not the only possible method, and the activation process may be instigated by the trusted intermediary system 103 itself, or by a third party communicating with one or both of the user terminal 101 and the intermediary system 103.

The trusted intermediary system 103, in step 111b, requests user input for a unique identifier from the user of the user terminal 101. In response, in step 111c, the user provides, and the intermediary system 103 receives, a suitable unique identifier.

As will be described in more detail below, a trusted data processing system 106 may be responsible for providing verification data elements associated with the unique identifier to the intermediary system 103. Consequently, in step 111d, the intermediary system 103 determines, using the unique identifier, whether a trusted data processing system 106 is able to provide one or more verification data elements associated with the unique identifier. This step may also include identifying, the trusted data processing system 106 which is able to provide one or more verification data elements associated with the unique identifier. Responsive to step 111d, the intermediary system 103 selects one of the first and second activation modes, represented by steps 111e and 111f respectively. The first and second activation modes will be described in more detail below in FIGS. 2b and 2c respectively. Nevertheless, following the activation—whichever mode is used—the activated credentials are made available for use in subsequent transactions as represented by step 111g.

An activation of credentials according to the first activation mode, i.e. step 111e, will now be described with reference to FIG. 2a. As mentioned above, this activation mode may be used where there is no suitable trusted data processing system 106 available to provide verification data elements. In step 112a, the intermediary system 103 requests additional user input for the one or more verification data elements associated with the unique identifier from the user. This user input may be received by the intermediary system 103 in step 112*b*.

Responsive to the user input, the intermediary system 103, in step 112*c*, activates a set of credentials including the input unique identifier, from step 111*b*, and the input one or more verification data elements associated with the unique identifier from step 112*b*. As a consequence of this activation, the intermediary system 103 may store, in step 112*d*, the activated credentials in a memory, such as memory 107. The activated credentials may be stored in a user record in the memory. The activated user credentials may subsequently be used for a transaction. This will be described below, after a description of the second activation mode.

Figure 2C:
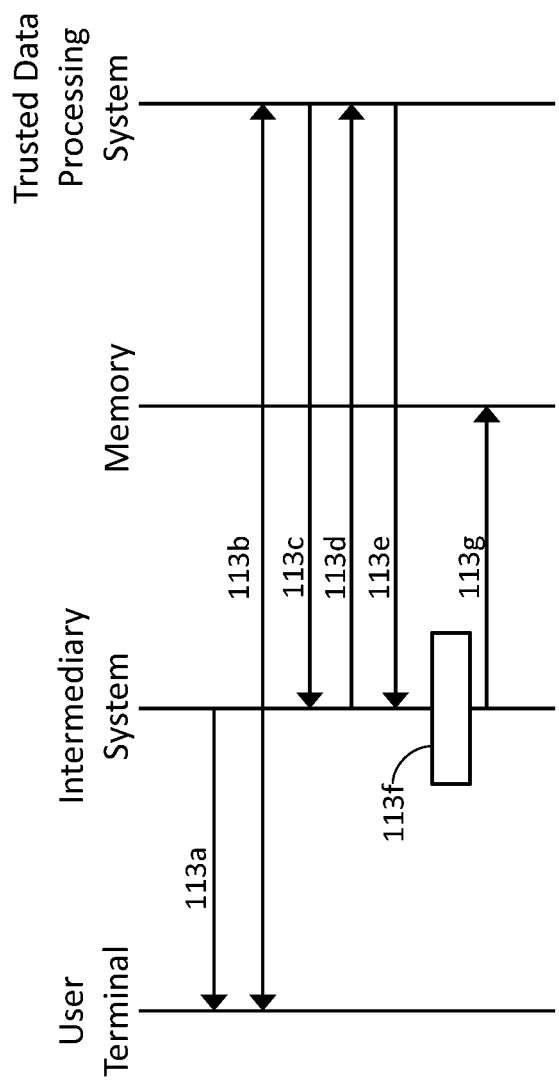

The second activation mode, described now with reference to FIG. 2*c*, may be used where the intermediary system 103 determines, based on the unique identifier, that there exists a trusted data processing system 106 which is able to provide one or more verification data elements associated with the unique identifier. As described with reference to FIG. 1, the intermediary system 103 may be configured for data communication with a plurality of trusted data processing systems 106, each responsible for providing verification data elements associated with different unique identifiers. Consequently, in for example step 111*d* above, the intermediary system 103 may use the unique identifier to identify, not only that a suitable trusted data processing system 106 exists, but an identity of the one of the plurality of trusted data processing systems which is responsible for providing verification data elements associated with the input unique identifier. This identity may be used to identify communications data, such as a network address and protocol or API data to enable the intermediary system 103 to communicate with the trusted data processing system 106. It will be assumed that, if required, appropriate identification of a trusted data processing system 106 has been performed.

Therefore, in step 113*a* of the second activation mode, the intermediary system 103 initiates an authentication process for the user. In the present example the authentication process is initiated between the user and the trusted data processing system 106. To enable this, in step 113*a*, the intermediary system 103 may send an appropriate message to the user terminal 101, after which the user performs, in step 113*b*, authentication with the trusted data processing system. However, the authentication process may alternatively, or additionally, be initiated between the user and the intermediary system 103 and/or the user and any network node remote from the intermediary system 103, for example a network node which is a part of the transaction processing system 102.

It will be assumed that the user of the user terminal 101 successfully authenticates during the authentication process. This successful authentication is then notified to the intermediary system 103. This may be done via data received from the trusted data processing system 106, as shown by arrow 113*c*. However in the alternative, the indication of successful authentication may be received from the user terminal 101. It will be appreciated that, should the authentication be initiated between the user and the intermediary system 103, a notification of successful authentication may not be required.

Consequently, and responsive to the user successfully authenticating during the authentication process, the intermediary system 103 activates a set of credentials including the user input unique identifier and one or more verification data elements associated with the unique identifier. While this activation is similar to the activation in the first activation mode above, in the case of using the second activation mode, the one or more verification data elements are requested and received from the trusted data processing system 106 via the data communications network 100. That is, the one or more verification data elements are received from a trusted data processing system 106 which is remote from the user.

Accordingly, in step 113*d*, the intermediary system 103 may request the one or more verification data elements from the trusted data processing system 106. This, as mentioned above, may be done responsive to the user successfully authenticating during the authentication process. The one or more verification data elements are received from the trusted data processing system 106 in step 113*e*. In step 113*f*, the intermediary system 103 activates the set of credentials. In step 113*g*, the activated set of credentials may be stored in the memory 107.

In some embodiments, receipt of the one or more verification data elements from the trusted data processing system 106 may be performed independently of the authentication. For example, the intermediary system 103 may receive the credentials for many users in a bulk transfer, and may therefore have already stored the appropriate credentials. Nevertheless, it is after the authentication of the user that the credentials are activated and are therefore made available for transactions.

The activated set of credentials may subsequently be used for a transaction. An exemplary transaction is illustrated in FIG. 2*d*. The transaction may be initiated by the user of the user terminal 101, by the intermediary system 103, or by any other party in the communications system, such as an element within the transaction processing system. Irrespective of how the transaction is initiated, in step 114*a*, the user provides authorization to the intermediary system 103 to use an activated set of credentials in the transaction. Having received such authorization, the intermediary system 103 may, in step 114*b*, request all or a part of the activated set of credentials from the memory 107. The credentials may subsequently be received, by the intermediary system 103, from the memory 107 in step 114*c*.

In step 114*d* the intermediary system 103 sends all or a part of the set of credentials to the transaction processing system 102. Upon receipt of the set of credentials, the transaction processing system 102 may use the verification data elements to authenticate and/or authorize a transaction. In this embodiment, the transaction processing system 102 sends the credentials to the trusted data processing system 106 in step 114*e*. To enable this, the transaction processing system 102 may be responsible for routing the unique identifier and at least one verification data element to the trusted data processing system 106, where a transaction is authorized.

The trusted data processing system 106 may then check the verification data elements against the unique identifier, and may subsequently authenticate and/or authorize the transaction, as represented by step 114*f*. In other words, during a transaction, the trusted data processing system 106 may authorize a transaction based on the unique identifier and at least one verification data element transmitted by the intermediary system 103 to the transaction processing system 102. Having done so, the trusted data processing system 106 may send a response to the transaction processing system 102 in step 114*g*.

With the transaction authorized and/or authenticated, the transaction processing system 102 may provide a response to the intermediary system 103 in step 114*h*, which is in turn provided to the user terminal 101 in step 114*i*.

In this way, the intermediary system 103 is able to provide credentials for a transaction on behalf of the user, which may be performed, as indicated by step 114*j*. Moreover, in the second activation mode, the credentials, or at least the one or more verification data elements, do not need to be input by the user (as is required in the first activation mode) but rather are retrieved by the intermediary system 103 from the trusted data processing system 106. This reduces error in entering the credentials, and also enables more complex credentials to be used, which in turn increases the security.

This also enables the trusted data processing system 106 and/or the intermediary system 103 to control who receives the credentials, as the user needs to be authenticated before the credentials are activated. This makes the distribution of these credentials more secure, and limits the value of copying credentials transmitted to a user by another means (for example by post or by email).

It will be appreciated that, in alternative embodiments, the functionality for authenticating the user (step 113*b*), for providing the verification data elements to the intermediary system 103 (step 113*e*), and for authorizing the transaction based on the credentials (steps 114*f*) may be provided by a single entity, such as the trusted data processing system 106 described above. However, one or more of these functions may be provided by other entities. For example, the authentication may be performed by a network node within the transaction system 102 or by the intermediary system 103. Equally, the authorization of the transaction, previously performed by the trusted data processing system 106, may be performed by a network node within the transaction processing system.

As will be appreciated from the foregoing, the credentials may be stored in association with a user record. Accordingly, the intermediary system 103 may be configured to store a plurality of user records, where each user record is associated with one or more sets of credentials. The intermediary system 103 may store, within a user record, the unique identifier within a set of credentials. In this case, the intermediary system 103 may not store any verification data elements in the user record, instead the intermediary system 103 may, when a transaction is to be conducted, use the stored unique identifier to perform an activation. The intermediary system 103 may thereby receive verification data elements to be used for the transaction, without being stored in the user record for any subsequent transaction. This enables the intermediary system 103 to ensure that the verification data elements are up to date when the transaction is made.

Alternatively, the intermediary system 103 may be configured to store, in a user record, both the unique identifier and one or more verification data elements associated with the unique identifier, within a set of credentials. This enables the user record to be used to provide the set of credentials when required, without repeated activation.

The user record may be associated with a username and password which may be used by the user to authenticate with the intermediary system 103, and/or to authorize the use of an activated set of credentials for a transaction.

In some embodiments, the intermediary system 103 may be configured to generate a user record responsive to the activation of a set of credentials. For example, the intermediary system 103 may receive the credentials prior to creating the user record, and subsequently create a user record to store the credentials.

As mentioned above, the user record may be associated with data username and password. In such embodiments, where the credentials are received prior to the creation of the user record, the intermediary system 103 may be configured to generate the username based on data received via a data communications network from the trusted data processing system. In such situations the generated username may be different to the unique identifier associated with the activated set of credentials. To provide an example, the trusted data processing system may store an email address and/or telephone number; this may be provided to the intermediary system 103 and used to automatically generate a username for the user record. This provides a more efficient mechanism for generating the user record.

In some embodiments, the intermediary system 103 may request and receive, prior to the request for a unique identifier, user input from the user whereby to initiate the generation of a user record. This may enable the user to create a user record first, before adding any activated credentials. Accordingly, the intermediary system 103 may be configured to add an activated set of credentials to an existing user record.

It will be appreciated that in some embodiments, the trusted data processing system 106 and the intermediary system 103 may have a trust relationship. As such, the intermediary system 103 may be able to retrieve the credentials from the trusted data processing system 106 without requiring specific authentication or authorization by the user.

In the above description, the unique identifier is used to determine which activation mode to use. However, in alternative embodiments, the user may identify, for example, the trusted data processing system 106 associated with their unique identifier, without providing as user input the full unique identifier. This may subsequently be used to determine the activation mode to use. The user may therefore be requested to provide the unique identifier after the selection of an activation mode. In other words, step 111*d* may precede steps 111*b* and 111*c*, which may be nevertheless, be performed for both the first and the second activation modes.

While the above has been described in the context of a generalized transaction system, the methods and apparatus above may have particular applicability to a system conducting financial transactions. In this application domain the unique identifier may comprise a Primary Account Number (PAN). This PAN may be associated with a financial instrument such as a debit or credit card. In such cases, the one or more verification data elements comprise one or more of: a billing name; one or more elements of a billing address; a shipping name; one or more elements of a shipping address; an email address; a telephone number; a card security code (CSC); card verification data (CVD); a card verification value (CVV or CVV2); a card verification value code (CVVC); a card verification code (CVC or CVC2); a verification code (V-code or V code); a card code verification (CCV); a signature panel code (SPC) a start date for a financial instrument; and an expiry date for a financial instrument.

The trusted data processing system 106 may comprise an issuing bank data processing system. Therefore, the trusted data processing system 106 is able to provide verification data elements associated with a given financial instrument. The transaction processing system 102 may correspondingly comprise an acquiring bank data processing system configured to route the unique identifier and at least one verification data element to the issuing bank data processing system. The transaction processing system 102 may also comprise a merchant processing system, a payment service provider (PSP) or an internet payment service provider (IPSP), and/or a card scheme processing system. In such embodiments, the transaction may be initiated by the user terminal 101 conducting a purchase through a merchant, and therefore step 114*a* may follow, for example, the user wishing to pay the merchant. It will also be appreciated that the conduction of a purchase with a merchant may also instigate activation of credentials, as represented by step 111*a*.

The authentication process (step 113*b*) may be initiated between the user and the issuing bank data processing system. In this way the issuing bank is able to control who has access to the verification data elements associated with financial instruments provided by that bank.

In some embodiments, the request for a unique identifier from the user is made as a part of a financial transaction, an example of which will be described below. Equally, the authentication process between the user equipment and the issuing bank may be a payment related authentication process, irrespective of whether a transaction is being performed. The activation of credentials during a transaction enables the credentials to be activated at the moment of first use which saves time and effort in entering and activating the data.

While the above has been described in more general terms, a more specific description of an embodiment being used within a financial transaction system will now be provided.

Figure 3:
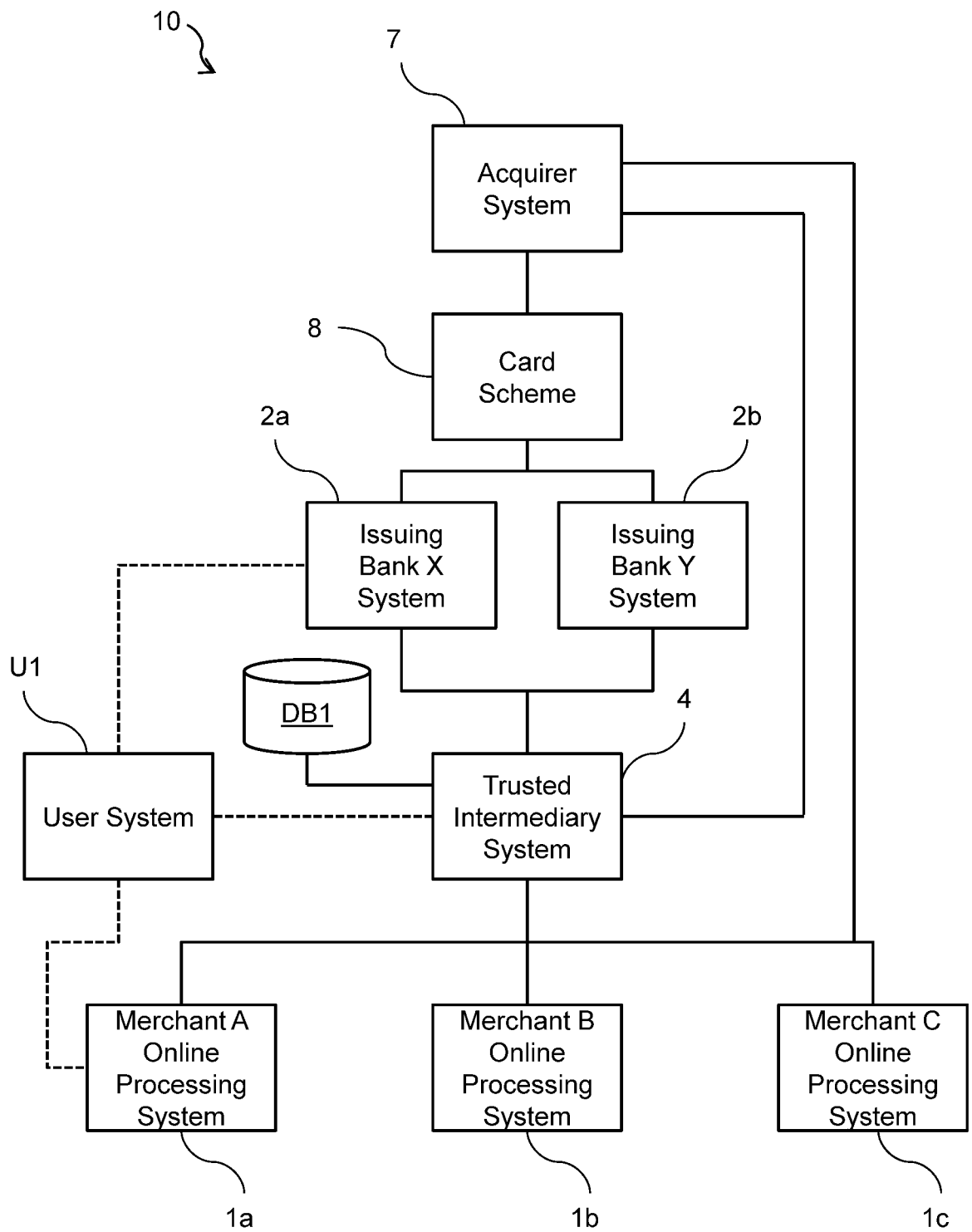
FIG. 3 is a schematic diagram showing a payment system in accordance with embodiments.
Figure 4:
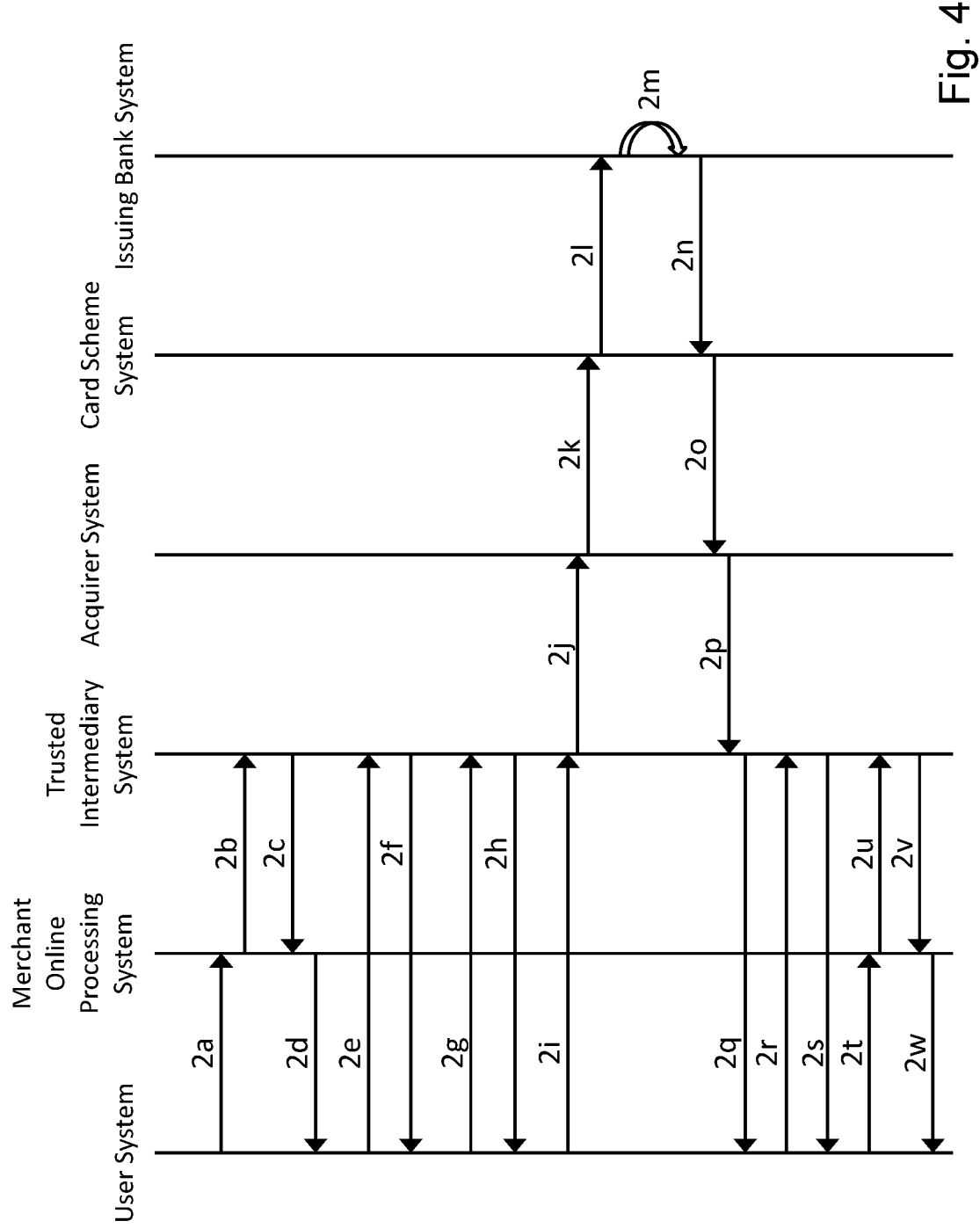
FIG. 4 is a schematic flow diagram showing the flow of data within the payment system during a transaction in accordance with embodiments.

FIG. 3 shows an example of a payment system 10 according to embodiments, in which a user, making use of an online device, referred to as user system U1, has one or more accounts (e.g. a current account or checking account) with one or more of a plurality of different issuing banks 2*a*, 2*b*. The user system U1 is analogous to the user terminal 101 described above.

The user system U1 may comprise a personal computer, a tablet computer device, a smartphone, smart TV or other Internet-connected device, for example, equipped with a browser which allows the user to access an online merchant shopping website provided by a merchant online processing system 1*a*, 1*b* or 1*c*. The user system U1 is connected via data communications links via which the user is able to enter into a transaction with one of a plurality of online merchant systems 1*a*, 1*b* or 1*c* when purchasing goods over the Internet. The online merchant systems 1*a*, 1*b* and 1*c* are equipped with website software that enables the user to select a payment method for the purchase of their selected goods. Each merchant online processing system 1*a*, 1*b* and 1*c* has been modified to include an option to pay using a trusted intermediary system, this identifying a payment request via a trusted intermediary system 4—which corresponds to the intermediary system 103 above.

The trusted intermediary system 4 holds data in a database DB1, equivalent to memory 107 above. The data may comprise details corresponding to merchants 1*a*, 1*b* and 1*c* and issuing banks 2*a* and 2*b* that have registered with the trusted intermediary system 4. The database DB1 also stores data identifying user records, referred to herein as "digital wallets" accessible via the trusted intermediary system 4. The digital wallet stores activated credentials associated with a user's financial instruments issued by the issuing banks 2*a* and 2*b*. The credentials may include a unique identifier such as a payment card number or Primary Account Number (PAN). The credentials may also include verification data elements, such as billing address, payment card expiry date, a card security code (CSC) such as a card verification value (CVV) or the like. By being activated the credentials are available for use.

The database may also store authentication data associated with each wallet. This authentication data may be used to enable a user to authenticate with the wallet and thereby be able to authorize transactions conducted using the credentials stored within the wallet. The digital wallet may also store other data, for example contact data which may be used by the provider of the digital wallet to provide alerts and notifications to the user.

The issuing banks 2*a* and 2*b*—which will operate in the role of the trusted data processing systems 106A and 106B—issue the financial instruments associated with the credentials stored in the digital wallet. These financial instruments are linked to an account held at the issuing bank, and use of the financial instrument enables transactions to be conducted on behalf of the account. A physical payment card (i.e. debit or credit card) is not necessary, and the issuing bank may not be required to issue a physical card in conjunction with the card number or other credentials.

Transactions may be routed back to the issuing bank that issued the financial instrument via an acquirer system 7 and card scheme payment processing system 8. The merchants, acquirer system 7 and/or card scheme payment processing system 8 may make up a transaction system, which performs the same role as the transaction system 102 as described above. As shown in FIG. 3 the trusted intermediary system may be connected to the acquirer system, as may the merchants 1*a*, 1*b* and 1*c*. Transaction data may therefore be provided from the trusted intermediary system 4 directly to the acquirer system 7, or may be provided to the merchant systems 1*a*, 1*b* and 1*c*, and from there to the acquirer system 7.

While not shown, one or more Payment Service Providers (PSPs) or Internet Payment Service Providers (IPSPs)—collectively IPSPs—may be included in the system 10. These IPSPs may be provided by operators distinct from either the operators of the merchant systems or the acquirer system. Nevertheless, for the purposes of this description, they may be considered to be a part of one or both of the acquirer system or the merchant systems, and accordingly data provided to these systems may be routed through an IPSP.

In some embodiments, the payment data may not be routed through the whole transaction system. For certain transactions, for example where the acquirer system and the issuing bank system are provided by the same operator, the card scheme 8 may not be involved in any transaction. Such transactions are sometimes called "on-us" transactions. Other transactions, may also not use all the elements shown, or may use alternative elements. For example, domestic processing may be used. Domestic processing is the processing of payment transactions by an entity other than a card schemes, and is used to enable local (country specific) card usage. A domestic processing element, not shown, may therefore be used for certain transactions.

Payment Processing Using a Digital Wallet

FIGS. 4, 5*a*, 5*b*, 5*c* and 5*d* illustrate a payment authorization request processing in accordance with some embodiments. In the steps described below in relation to FIGS. 4 and 5, the user already has a user record or account, also referred to herein as a "digital wallet", held by the trusted intermediary system 4. The digital wallet includes credentials associated with one or more transactional accounts held by the user.

Prior to step 2*a*, the user has completed their shopping experience with an online merchant using the merchant online processing system, has initiated checkout to purchase one or more items, and has proceeded to a virtual checkout, according to conventional methods available through commonly available shopping cart and checkout software packages such as are known to the skilled person.

The online merchant's website prompts the user to select a payment option for the purchase. This may be displayed to the user in a similar manner to that shown in FIG. 5a. In embodiments, the options include options to pay by credit or debit card, by entering their card details directly into the merchant website, or to opt for payment using a digital wallet via the trusted intermediary system. Note that in FIG. 5a, and in various ones of the following figures, the trusted intermediary system is referred by the initials "TIS"—so for example, the button labelled "Pay by TIS" corresponds with the option to pay via the trusted intermediary system.

At step 2a, the user selects the option to pay using their digital wallet (i.e. pay by TIS) and the user system U1 transmits a corresponding request to the merchant online processing system 1.

At step 2b, the merchant online processing system 1 transmits a message to the trusted intermediary system 4 including for example an amount of payment for the one or more items, a merchant account identifier and an identifier for the order.

At step 2c, the trusted intermediary system 4 transmits to merchant online processing system 1 a Uniform Resource Locator (URL) of a login page for the digital wallet service and the merchant online processing system 1, in step 2d, transmits the Uniform Resource Locator (URL) in e.g. an iFrame, the content of which is to include the digital wallet service login page, which the user system 1 retrieves from the trusted intermediary system 4 at steps 2e and 2f. The iFrame is used to embed the login page for the digital wallet service in the online merchant's payment webpage. The login page may be displayed to the user in the iFrame in a similar manner to that shown in FIG. 5b.

At step 2g, after the user enters their digital wallet authentication data, for example a username and password, into the login page, the user system U1 transmits the entered details to the trusted intermediary system 4.

Figure 5A:
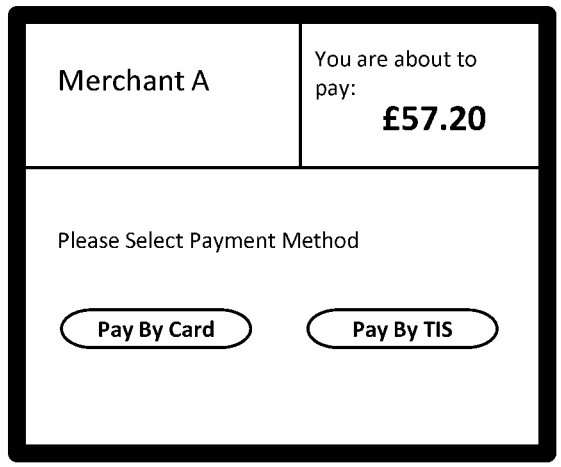
FIGS. 5a, 5b, 5c and 5d show representations of content displayed to a user during the process shown in FIG. 4.
Figure 5B:
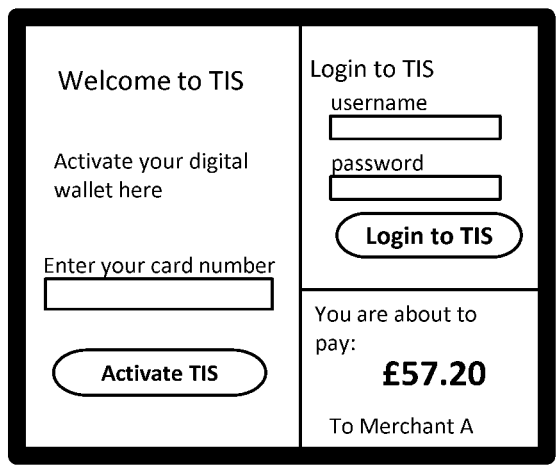
Figure 5C:
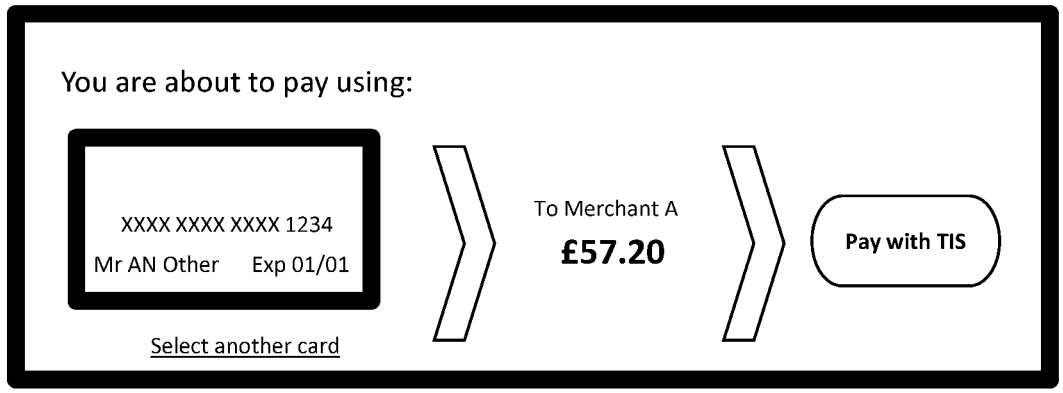

At step 2h, the trusted intermediary system 4 authenticates the user based on the digital wallet authentication data received at step 2g and, following successful authentication, transmits a payment option selection request to the user system U1. The payment option selection request may include a default payment option identifier with, if required the option to change the payment option used such as shown in FIG. 5c. Alternatively a list of payment options may be presented for one to be selected. Each payment option will be associated with an activated set of credentials, i.e. an activated card, stored in the digital wallet.

At step 2i, after the user has confirmed the default payment option and/or selected a payment option from the displayed list and confirmed they wish to proceed with the payment, the user system U1 transmits a confirmation message to the trusted intermediary system 4.

At steps 2j, 2k and 2l, the trusted intermediary system 4 transmits a payment authorization request to the issuing bank system 2 via the acquirer system 7 and the card scheme processing system 8. The payment authorization request includes a unique identifier, such as a PAN, and associated verification data elements, such as an expiry date and a card security code which have been retrieved from the digital wallet. The payment authorization request also includes details of the merchant and the payment amount. The request may be routed through the acquirer system and the card scheme system in ways known in the art.

At step 2m, issuing bank system 2 receives and processes the payment authorization request. The issuing bank system 2 may generate an authorization code indicating that it has authorized the payment request.

At steps 2n, 2o and 2p, the issuing bank system 2 transmits a payment authorization response to the trusted intermediary system 4 via the card scheme processing system 8 and the acquirer system 7.

Figure 5D:
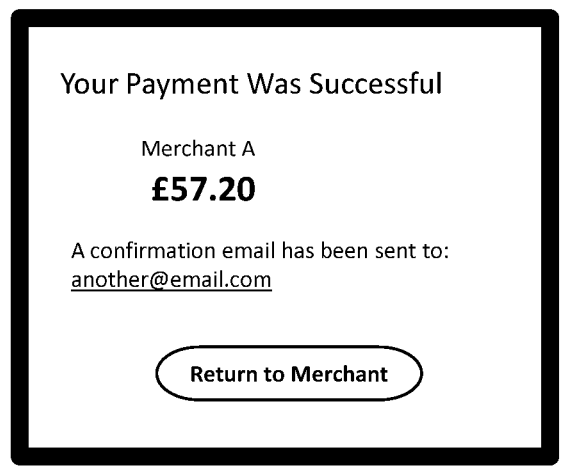

At step 2q, after receiving the payment authorization response, the trusted intermediary system 4 transmits an appropriate payment authorization confirmation to the user system in step 2q, an example of which is shown in FIG. 5d.

The user may then select to leave the trusted intermediary system and return to the merchant web systems. Accordingly, the user provides input in step 2r which upon receipt by the trusted intermediary causes the trusted intermediary to send, in step 2s, the user system U1 data which causes the user system U1 to return to the merchant webpage. Subsequently, in step 2t, the user system U1 contacts the merchant, indicating that the TIS payment is complete. The merchant may contact the trusted intermediary system in step 2u to confirm the authorization of the payment, a response being received from the trusted intermediary system in step 2v. The merchant may finally send, in step 2w, a confirmation of purchase to the user system U1. The transaction may subsequently be settled by any mechanism known in the art.

Digital Wallet Creation and Activation of Credentials

Embodiments have been described above in which the user has already created a digital wallet at the trusted intermediary system 4 and activated a set of credentials, i.e. credentials, stored within it. Embodiments will now be described for creating a digital wallet at the trusted intermediary system 4, and activating credentials to be stored within it.

The wallet may be created and/or credentials may be activated in a number of ways. First, the digital wallet may be created via a banking website, which may then cause credentials to be activated within the new digital wallet. This will be described with reference to FIGS. 6 and 7. Alternative methods include creating/activating by accessing the trusted intermediary system 4 directly, and by creating/activating during a transaction. These are described in FIGS. 8 to 13. In the latter two cases, the process may be performed using a first activation mode or a second activation mode, analogous to the first and second activation modes described above.

Digital Wallet Activation Via Online Banking Website

Figure 6:
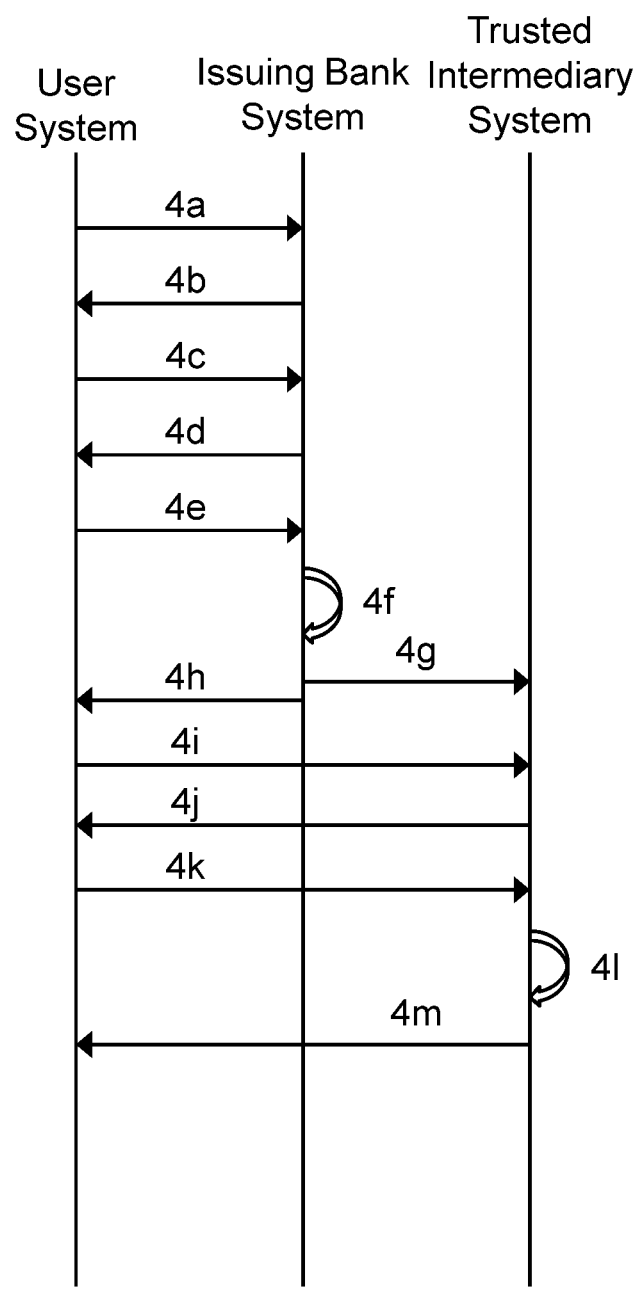
FIG. 6 is a schematic flow diagram showing the flow of data within the payment system for activation of credentials via a bank in accordance with embodiments.

In embodiments depicted in FIGS. 6 and 7, a user creates their digital wallet and activates credentials via their online banking website. In these embodiments, the user activates the digital wallet before any transaction to pay with the digital wallet is initiated.

At step 4a, the user enters the URL of the online banking login webpage associated with their online banking service into their browser, or otherwise accesses their online banking login page. Alternatively, the user may use specific application software, such as a smartphone application, to access their online banking system.

At step 4b, the user system U1 retrieves the online banking login webpage, which may prompt the user to enter their online banking credentials, including a username such as a customer number, and one or more of password, memorable personal data, a Personal Identification Number (PIN), generated data such as a onetime password generated using a payment card and a card reader, or any suitable mechanism. The interface between the user system U1 and the issuing bank system 2 may be configured according to an online banking protocol.

At step 4c, the user enters their online banking credentials into the online banking login webpage and the user system U1 transmits the entered online banking credentials to the issuing bank system 2.

At step 4d, following successful authentication of the user based on the entered online banking credentials, the issuing bank system 2 redirects the user to a webpage that displays an option to activate a digital wallet with the trusted intermediary system 4, for example by displaying a button including suitable text.

At step 4e, the user selects the option to activate the digital wallet and the user system U1 transmits a message indicating the user's selection of this option to the issuing bank system 2.

At step 4f, the issuing bank system 2 retrieves credentials associated with one or more transactional accounts held by the user at the issuing bank. For example, the credentials may comprise a unique identifier, for example a PAN associated with one or more current accounts and/or one or more payment cards, such as a debit card or credit card, held by the user at the issuing bank. The credentials may also include one or more verification data elements associated with the unique identifier, exampled of which are provided above. The credentials may also include data, such as an email address or telephone number, which may be used, as described below, to create the digital wallet.

At step 4g, the issuing bank system 2 provides the credentials to the trusted intermediary system. The issuing bank system 2 may, in step 4h, send data to the user system U1 redirecting the user system to the trusted intermediary system 4. In step 4i, the user system U1 requests data from the trusted intermediary system 4, which is provided in step 4j.

Figures 7A, 7B:
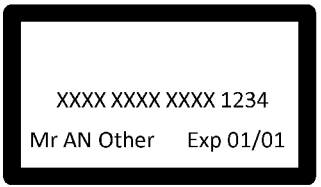
FIGS. 7a and 7b shows a representation of content displayed to a user during the process shown in FIG. 6.
Figure 8:
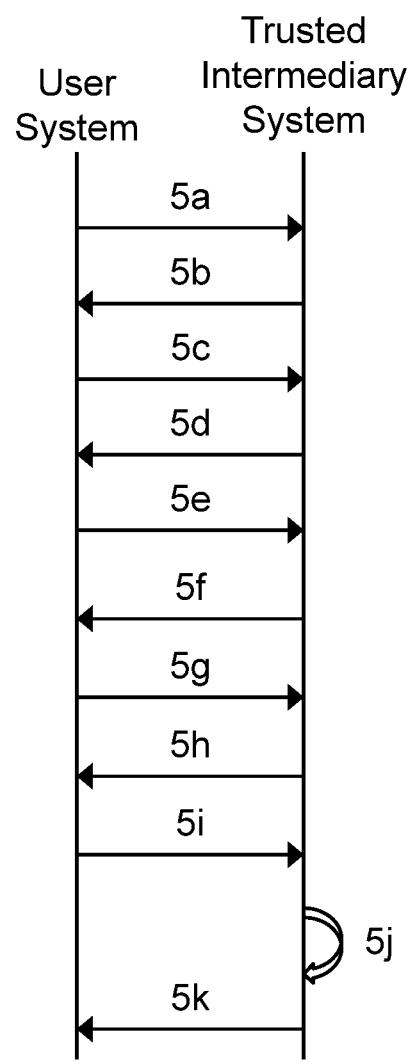
FIG. 8 is a schematic flow diagram showing the flow of data within the payment system for activation of credentials via the trusted intermediary using a first activation mode in accordance with embodiments.

The data provided by the trusted intermediary system 4 in step 4j may comprise a page, such as the one shown in FIG. 7a, in which the user is requested to select one or more payment instruments issued by the issuing bank. This page may display all, or at least a part, of the unique identifier and the one or more verification data entities retrieved in step 4f. For example, for each of the user's cards, a PAN, name and expiry date may be shown. The user may select one or more of these cards for activation.

In addition, one or more of the retrieved credentials of the user, for example an email address or telephone number, may be used to provide authentication or contact data for the digital wallet. These credentials may be used to automatically populate the corresponding fields for the wallet activation, as shown for the email address and telephone number displayed in FIG. 7a. In particular, one of the credentials retrieved from the issuing bank system 2, for example an email address, may be used to present a proposed login name or username for the newly created wallet. This provides the advantage that the user is not only released from entering transaction credentials, but has an easy to remember username automatically presented. This username may be an email address, but may equally be a telephone number, or a login username used, by the user, at the issuing banking system 2 for conventional online banking. Any other information may be presented as a username, the selection of which will be determined by the issuing bank or the trusted intermediary. The user may simply confirm the proposed authentication and contact data. However the user may be allowed to edit these details.

At step 4k, the issuing bank system 2 receives the user's response to the request of step 4j. This response may indicate which payment instruments are to be used to activate credentials in the digital wallet. The response may also include authentication and contact data, such as username and password, as described above.

At step 4l, the trusted intermediary system 4 creates a digital wallet for the user and activates the credentials received from the issuing bank system 2 at step 4g. The trusted intermediary system 4 therefore associates the digital wallet credential(s) with the user's digital wallet.

At step 4m, the trusted intermediary system 4 transmits an appropriate confirmation message to the user system U1 for display to the user to confirm that their digital wallet has been successfully activated at the trusted intermediary system 4. An exemplary confirmation page is shown in FIG. 7b. After this, the user may return to the online banking webpages.

The intermediary system 4 may generate and send an e-mail to an e-mail address associated with the user to confirm successful activation and/or notify the user via an SMS to registered mobile phone and/or send an alert to the user's mobile banking, wallet or payment application on their mobile phone, for example using push notifications.

As such, the user's digital wallet is pre-populated at activation with payment credentials from the user's issuing bank. This reduces the risk of the user erroneously entering incorrect credentials compared to manual entry by the user. This also reduces the amount of user interaction for adding the credentials to the digital wallet since it is added automatically by the issuing bank system 2, rather than being entered manually by the user. The wallet may also be created using retrieved credentials, such as the email address and telephone number described above. This further facilitates the creation of the wallet and reduces the potential for error.

One advantage of using contact details, such as an email address or telephone number from the issuing bank, is that these details may be taken to be verified. Here verification of contact details indicates that the contact details are known to be associated with the user. A typical method of verifying contact details is to send a message, such as an email or SMS, which contains a code. If the message is received by the user, the user will be able enter the code. Since the user will only receive the code if the contact details are correct, the user being able to enter the code indicates that the contact details are correct, and are therefore verified.

If the user manually enters any contact detail element, such as telephone number or email address, the trusted intermediary system may verify these details. However, if the contact details are provided by the issuing bank, then the details may be assumed to be verified, and therefore any verification steps are not required. This demonstrates an advantage of using contact details provided by the issuing bank, as verification steps can be avoided.

In some embodiments, the issuing bank system 2 records the successful activation of the digital wallet for the user such that it need not display an option to activate a digital wallet with the trusted intermediary system 4 each time the user logs into their online banking service.

In some embodiments, the issuing bank system 2 transmits credentials associated with one or more transactional accounts held by the user to the trusted intermediary system 4 prior to the user selecting an option to create their digital wallet and activate a set of credentials. The trusted intermediary system 4 may then store the credentials in the database DB1 and retrieve the credentials associated with the user if and when the user creates their digital wallet and/or activates the credentials. As such, the activation request of step 4*i* would comprise authentication-indicative data, and may include the additional data, but may not the credentials itself. In some such embodiments, the issuing bank system 2 transmits a batch of credentials for multiple different users prior to those users activating a digital wallet with the trusted intermediary system 4.

Creation of Digital Wallet and Activation of Credentials Via the Trusted Intermediary System 4

In the embodiments depicted in FIGS. 8 to 11 a user creates their digital wallet with the trusted intermediary system 4 directly via a digital wallet creation webpage associated with the trusted intermediary system 4, in so doing the user activates a set of credentials within the wallet. In these embodiments, the user activates the digital wallet outside any transaction.

As mentioned above, embodiments envisage a first activation mode and a second activation mode. Accordingly, the creation of the digital wallet and activation of the associated credentials, via the trusted intermediary system, in the first activation mode will be described with reference to FIGS. 8 and 9.

At step 5*a*, the user enters the URL of the trusted intermediary login webpage associated with the trusted intermediary 4 into their browser, or otherwise accesses the trusted intermediary login webpage. Alternatively, the user may use specific application software, such as a smartphone application, to access their trusted intermediary system 4.

Figure 9A:
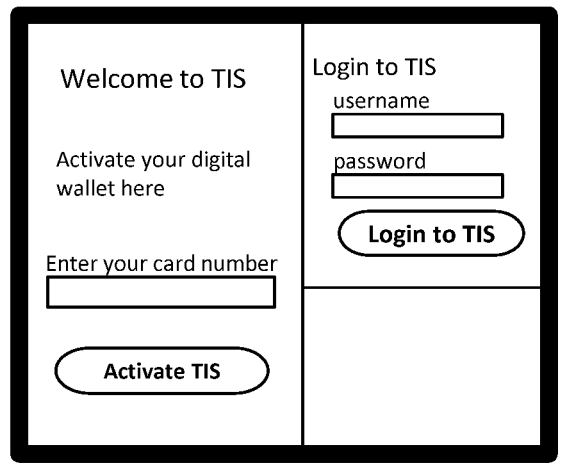

At step 5*b*, the user system U1 retrieves the trusted intermediary login webpage, shown in FIG. 9*a*. This webpage offers the user the ability to setup a digital wallet and, in addition, may offer the user the opportunity to login, should a digital wallet already be created.

In step 5*c* the user selects to setup the digital wallet. In so doing the user may provide, by way of user input, a card number or PAN. In this example, the issuing bank who issued the financial instrument associated with the card number is not able to provide credentials associated with the financial instrument to the trusted intermediary. Therefore, the first activation mode, where user input is requested for the input of the credentials is used.

Figure 9B:
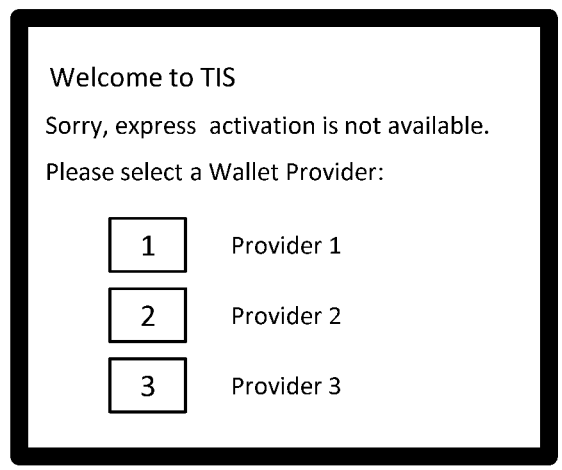

Therefore, in step 5*d*, the trusted intermediary sends a further webpage to the user. This page is shown in FIG. 9*b* and prompts the user to select a desired wallet provider. This wallet provider may be the issuing bank of the card the user wishes to add to the wallet, however this is not a requirement, and any party may be a wallet provider.

Figure 9C:
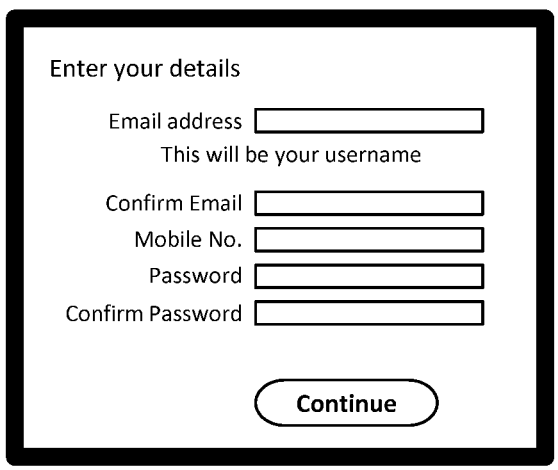

In step 5*e* the user selects a wallet provider, and consequently, in step 5*f*, receives the next page, shown in FIG. 9*c*, which requests the user input a username and password, as well as contact details for the wallet such as an email address and telephone number. These details will be used to create the digital wallet, and enable the user to later login to the wallet. These details may be verified, by sending a verification code to the address indicated by the details. Upon receipt of the code, the user may provide it to the trusted intermediary as user input and thereby verify the address. This is not shown, however, a page requesting the entry of the verification code may be displayed following the display of the page shown in FIG. 9*c*.

The user provides the requested details in step 5*g*, which causes the trusted intermediary to provide a fourth page in step 5*h*, shown in FIG. 9*d*, in which the user is requested to input details of the card to be stored in the wallet. These details include a unique identifier, such as the card number or PAN, and a number of verification data elements, such as a cardholder name, expiry date, security number and billing address. While not shown, the card number field may be automatically populated using the card number previously entered.

In step 5*i*, the user system provides the details entered into the page shown in FIG. 9*d*. Using the user inputted set of credentials, the trusted intermediary, in step 5*j*, may then activate the set of credentials, making them available to be used in subsequent transactions. As a part of the activation step 5*j*, the user may be required to authenticate with the issuing bank. Accordingly, the user system U1 may be redirected to an authentication page at the issuing bank system 2, and may enter authentication details associated with the entered card details. This authentication process will be described in more detail in FIG. 11. Following activation, in step 5*k*, the trusted intermediary may send a confirmation message to the user, such as shown in FIG. 9*e*.

It will be apparent that in the case that a digital wallet has already been set up, but where a card needs to be added, the above method may, after user login and receipt of input from the user requesting to add a card to the wallet, proceed from step 5*g* and display the screen shown in FIG. 9*d* directly.

Figure 10:
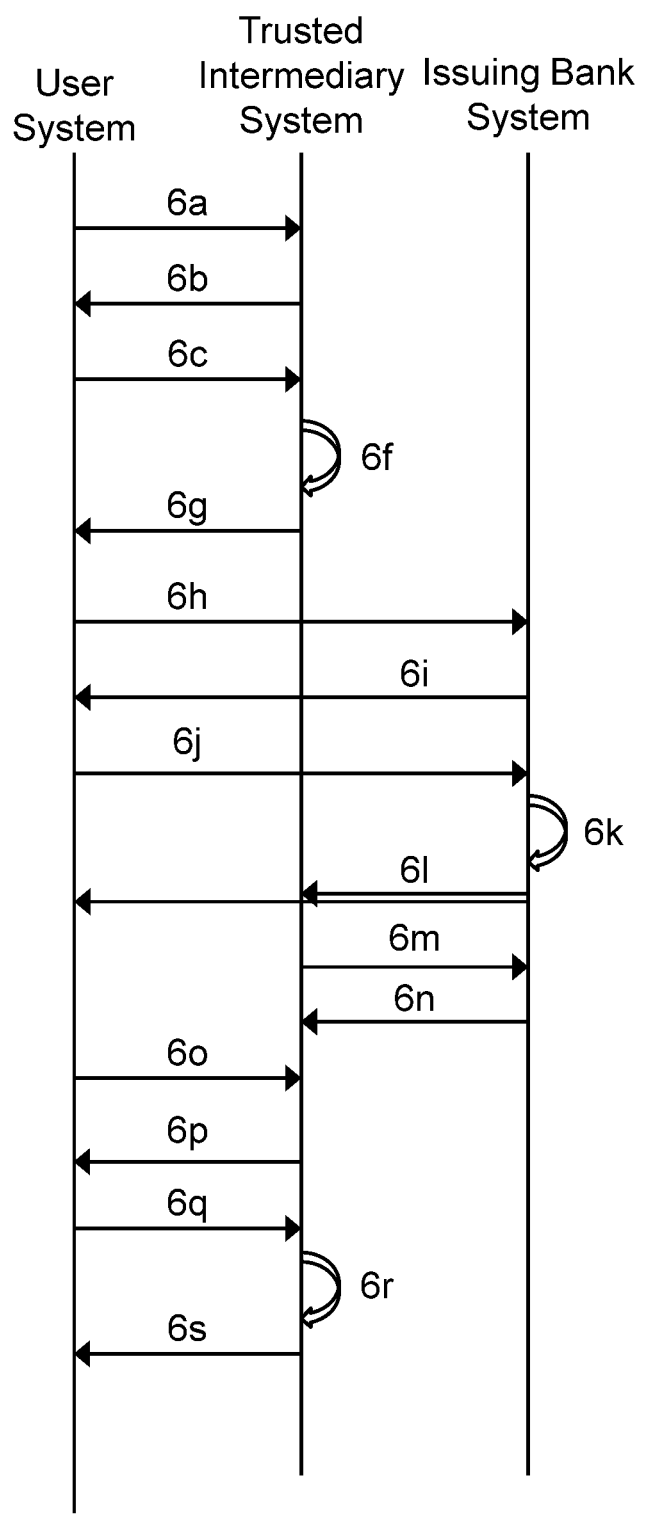
FIG. 10 is a schematic flow diagram showing the flow of data within the payment system for activation of credentials via the trusted intermediary using a second activation mode in accordance with embodiments.

In the alternative, creation of the wallet and activation of the credentials using a second activation mode will now be described with reference to FIGS. 10 and 11.

At step 6*a*, the user system U1 requests the digital wallet login or activation webpage, for example as a result of the user entering the URL of the digital wallet home webpage or otherwise.

Figure 11A:
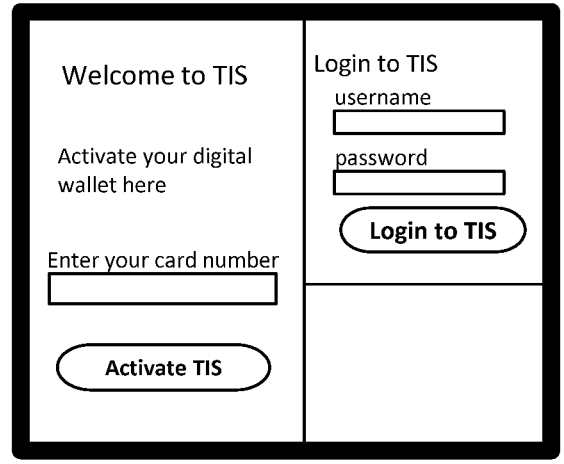

At step 6*b*, the user system U1 receives the digital wallet activation webpage from the trusted intermediary. The digital wallet activation webpage, such as is shown in FIG. 11*a*, provides the user with an option to activate a digital wallet with the trusted intermediary system 4 and may also provide the user with the option to log into their digital wallet service if they already have a digital wallet to manage their account. The activation webpage shown in FIG. 11*a* allows the user to enter a unique identifier, i.e. a card number or PAN directly as a first step in setting up the digital wallet.

At step 6*c*, the user enters an appropriate card number and selects the option to activate a digital wallet. This user input is then received by the trusted intermediary system 4.

At step 6*f*, the trusted intermediary uses the card number provided as user input in step 6*c* (i.e. the unique identifier) to identify the issuing bank system associated with the card number. This issuing bank system will be the bank system of the bank which issued the card to the user. This step may be performed using a lookup table of card numbers and the associated issuing bank.

In step 6*g* the trusted intermediary system 4 instigates an authentication process between the user system U1 and the issuing bank system. There are a number of ways this may be done. For example the trusted intermediary system 4 may, in step 6*g*, provide the user system with a link or URL to authentication webpage at the issuing bank. This link may cause a webpage, provided by the issuing bank system to be loaded within an iFrame within a webpage provided by the trusted intermediary.

Figure 11B:
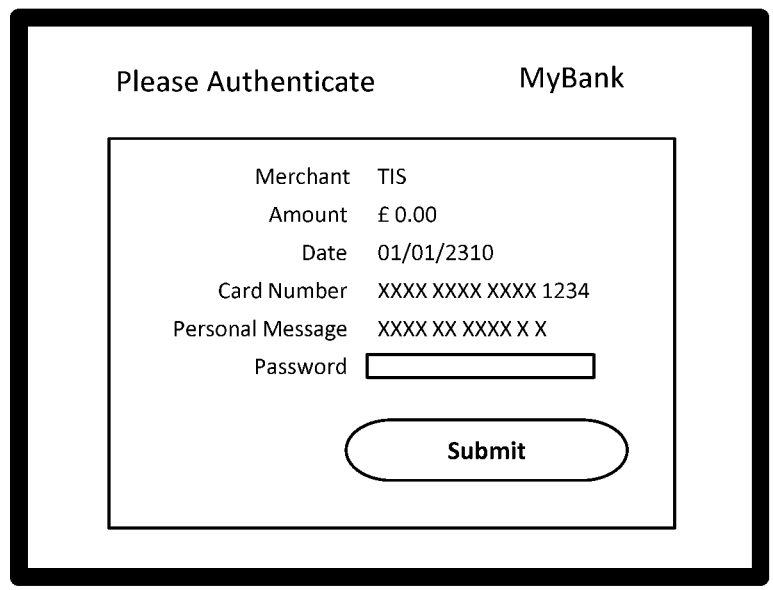
Figure 11C:
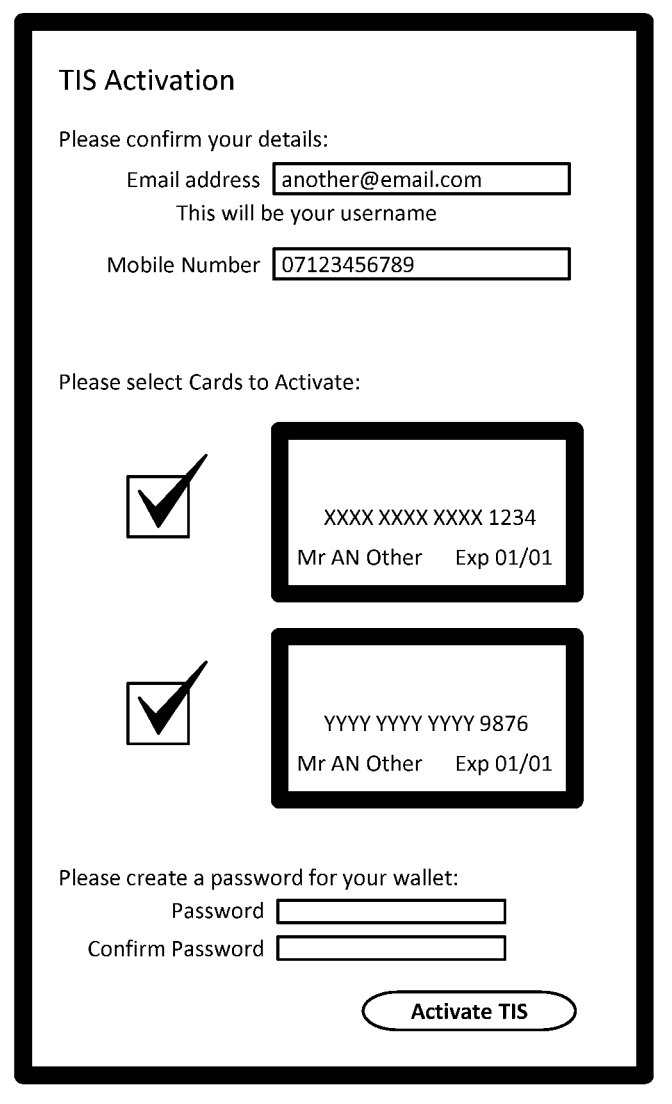
Figure 11D:
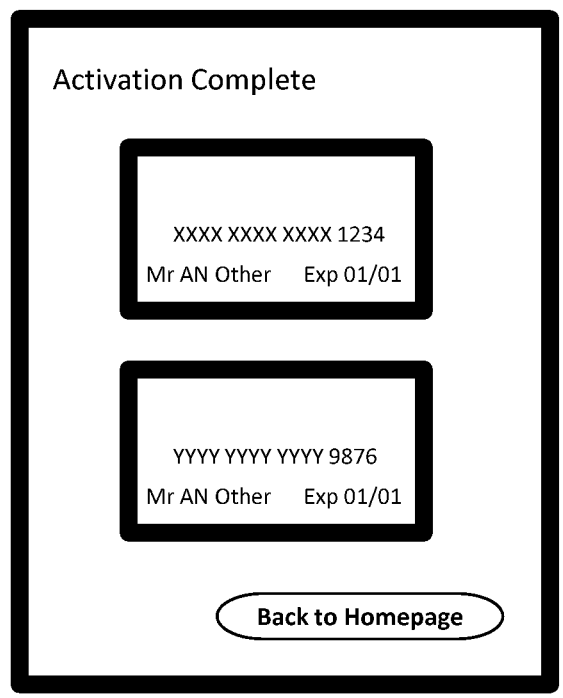

Consequently in step 6*h* the user equipment contacts the issuing bank and in step 6*i* is provided with an authentication page such as shown in FIG. 11*b*. It will be realized that, so far, the user has only been required to enter a card number and click a single button. The other steps were all performed autonomously by the system.

The issuing bank may be provided with information indicating that the authentication is for the purposes of activating credentials. In this example the issuing bank has received an authenticating request in which an indicated merchant name is "TIS" (for trusted intermediary system), and in which the transaction amount has been set to zero. Both these fields are shown in FIG. 11b.

In step 6j the user inputs an appropriate authentication credential into the authentication webpage. This credential is then sent to the issuing bank. Subsequently, in step 6k, the issuing bank authenticates the user using the input authentication credential. Assuming the user to be authenticated, the issuing bank makes a response indicating that the user has been authenticated.

This response may be sent to the user system and to the trusted intermediary in step 6l. Responsive to the indication that the user is authenticated, the trusted intermediary may then request, in step 6m, credentials associated with the card number from the issuing bank. These credentials may be the same, or similar, to the credentials entered manually by the user into the webpage shown in FIG. 9d. The credentials are delivered to the trusted intermediary in step 6n.

In addition, upon receipt of the response in step 6l, the user system U1 may redirect to the trusted intermediary system 4. Therefore in step 6o, the user system may request a further page from the trusted intermediary system 4.

An example of this page is shown in FIG. 11c. In a similar manner to the page provide in FIG. 7a, the page request the user enter or confirm contact details such as an email address and/or a telephone number. As described above the username, which may be an email address or telephone number, may be created using the credentials received from the issuing bank. Therefore the page may be pre-populated with email address and mobile telephone number received from the issuing bank.

The page may also display one or more of the credentials received from the issuing bank to confirm that the details have been correctly retrieved. Where the issuing bank holds more than one financial instrument for the user, all the financial instruments may be displayed for the user to pick one or more. Details of these cards are shown, including card number as well as verification data elements, in this case the cardholder name and expiry date are shown in FIG. 11c. As is apparent, this system enables authentication using a first unique identifier, i.e. card number, to be used to retrieve more than one card number and more than one set of verification data elements. Each may be activated, based on the earlier authentication of the user, therefore the user, through a single unique identifier (card number) is able to populate a wallet with details of multiple cards or other financial instruments.

In step 6p, the user provides user input to the trusted intermediary system. This user input may confirm the details sent in step 6o, may select one or more of the offered financial instruments, and may provide a password. In response, in step 6r the trusted intermediary creates the digital wallet, and activates the credentials provided by the issuing bank. A confirmation message, such as the page shown in FIG. 11d may be provided to the user system U1. As can be seen, the user has activated two cards, therefore both these cards are shown as being activated.

Therefore, it can be seen that by requesting a unique identifier from the user, and then instigating an authentication process between the user and the issuing bank, the creation of the digital wallet, and the activation of credentials is substantially simplified in the second activation mode in comparison to the first activation mode.

It will be apparent that in some cases, the trusted intermediary system 4 may determine that the card number input in step 6c was issued by a bank which is unable to provide the credentials as described in step 6n. Therefore, in such cases the intermediary system may use the first activation mode described above in FIG. 8, and in particular move to step 5c of this Figure.

Digital Wallet Activation Via a Merchant Online Processing System

Figure 12:
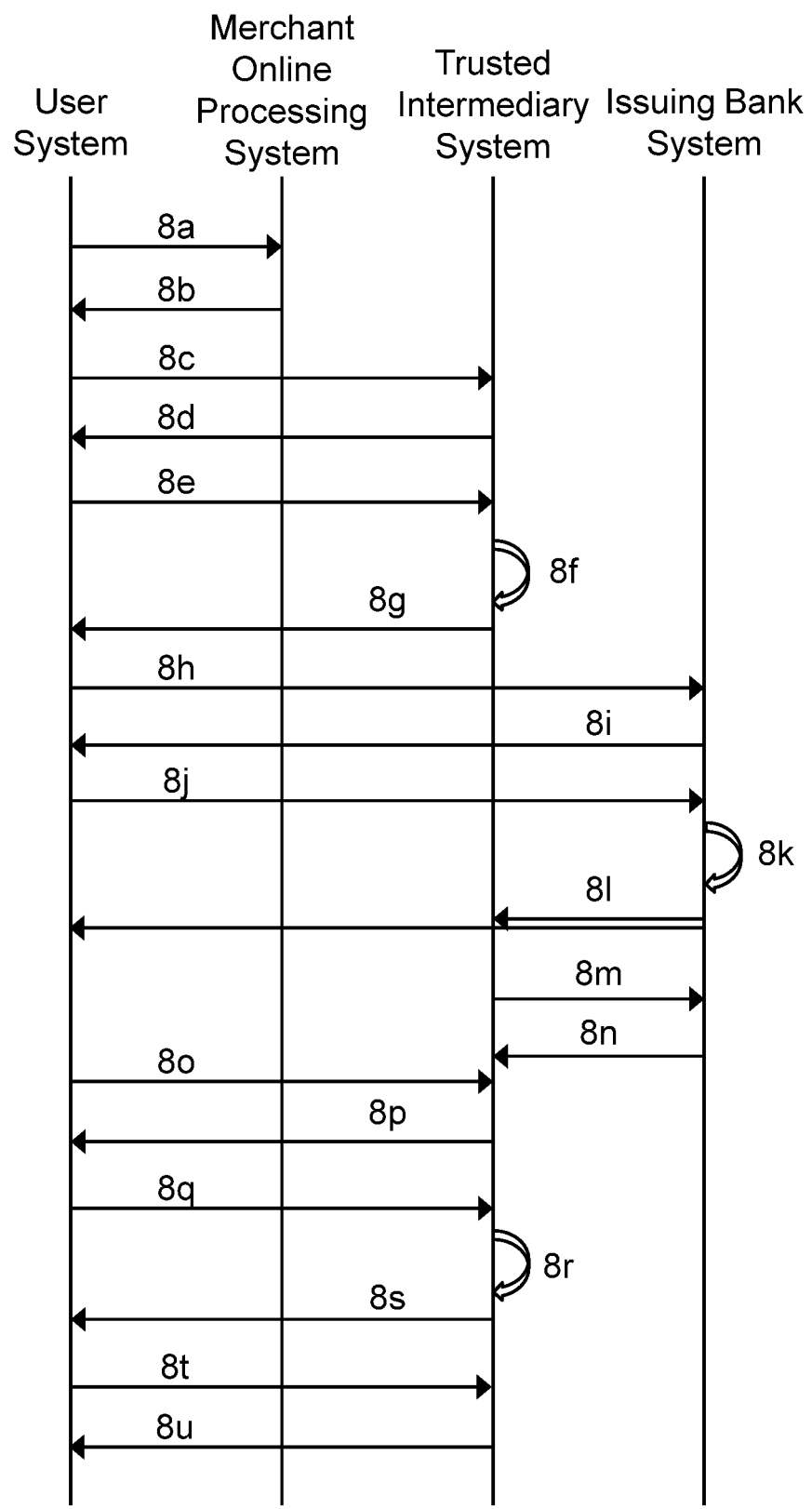
FIG. 12 is a schematic flow diagram showing the flow of data within the payment system for activation of credentials via a merchant using a second activation mode in accordance with embodiments.

In embodiments depicted in FIGS. 12 and 13, a user creates their digital wallet and activates credentials during transaction processing via the merchant online processing system 1. Activation can thereby be embedded seamlessly into the user's checkout experience and uses authentication through online banking for activation. In these embodiments, the user creates the digital wallet in-transaction. For simplicity, only the second activation mode, in which credentials are received from the issuing bank, will be described. Nevertheless, in cases where the second activation mode is not possible, such as where the issuing bank is unable to provide the verification data, it will be apparent that the first activation mode may be used in this context.

Figure 13A:
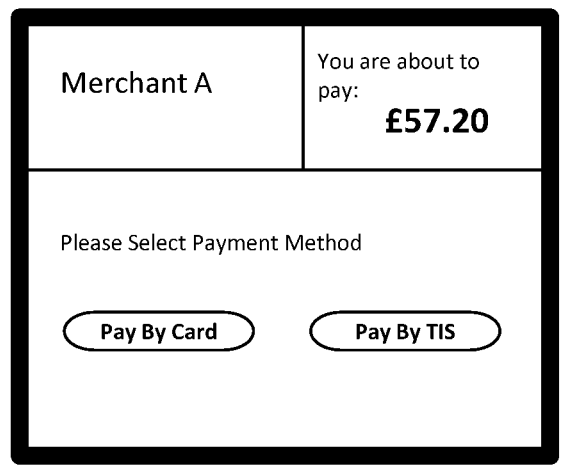
FIGS. 13a, 13b, 13c, 13d, 13e and 13f show representations of content displayed to a user during the process shown in FIG. 12.

Prior to step 8a, the user has initiated a transaction via the online merchant, has selected one or more products and/or services for purchase, and has initiated a purchase completion process. The user is prompted to select a payment option for their purchase. The payment options include paying using a digital wallet, such as is depicted in FIG. 13a.

At step 8a, the user selects the option to pay using a digital wallet, and the user system U1 transmits a corresponding message to the merchant online processing system 1.

Figure 13B:
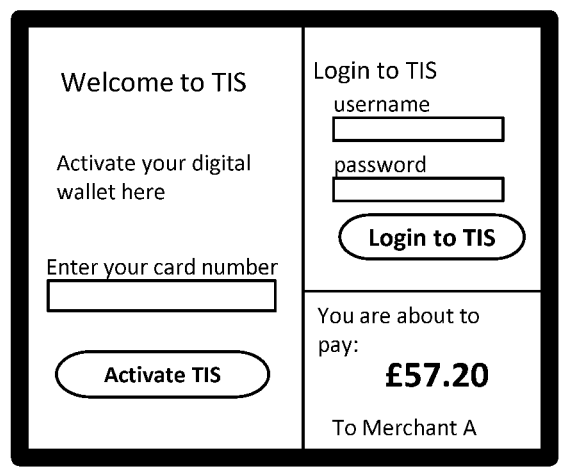

At steps 8b, 8c and 8d, the merchant online processing system 1 transmits a message to the user system U1 to trigger the browser to reload its payment page within an iFrame, the content of which is provided by the trusted intermediary system 4 and which corresponds to the content of a digital wallet payment page. The message sent from the user system U1 may include a return merchant URL, which is passed from the merchant online processing system through the user system U1 to the trusted intermediary system 4 in message 8c, where it is temporarily stored for use later in the process. The iFrame provides the user with an option to activate a digital wallet with the trusted intermediary system 4. The content of the iFrame may be such as is shown in FIG. 13b, and is similar to the page described above with reference to FIGS. 9a and 11a, with the details of the merchant and the amount payable included. The user may be presented with the option to login to the TIS, an alternatively to create a digital wallet. To enable the wallet to be created, the user may be prompted to enter a card number, i.e. a PAN.

At step 8e, after the user has selected the option to create a digital wallet, and has provided the card number as a user input, the user system U1 transmits a message to the trusted intermediary system 4 indicative of the user requesting digital wallet activation, and providing the card number to the trusted intermediary.

Steps 8f to 8r proceed as per steps 6f to 6r, with only minor differences. In these steps, the trusted intermediary identifies the issuing bank and the user authenticates with the issuing bank. Upon successful authentication, the user record is created and the credentials, received from the bank, are activated within the user record.

Figure 13C:
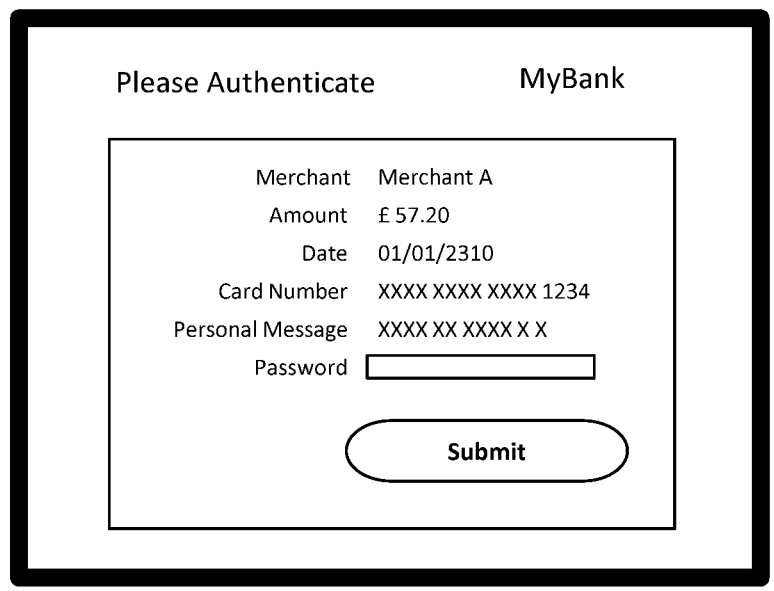
Figure 13D:
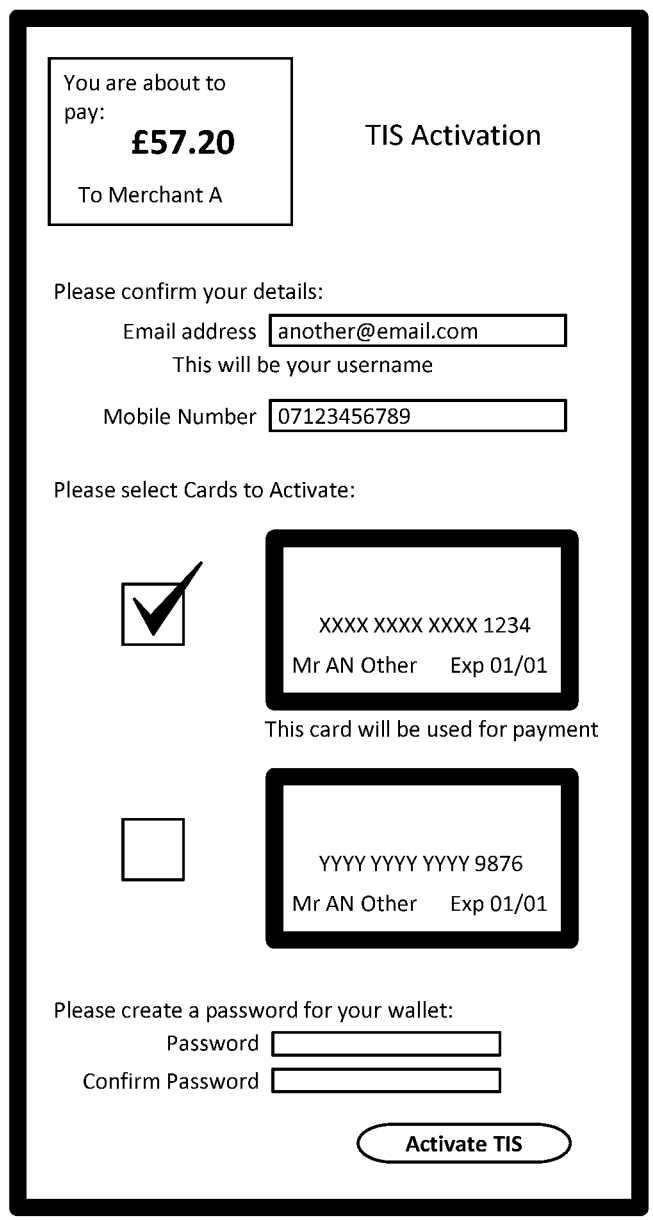

As with the activation mode instigated through the wallet interface, the authentication here in steps 8i and 8j also uses an authentication process performed by the issuing bank. However in this instance, the authentication can additionally be used to authenticate the user in relation to the transaction. This has a first advantage that the user need only authenticate once to both activate the credentials and to authenticate for the transaction. FIG. 13c shows the screen which may be displayed for the authentication. Here the merchant field not only contains the name of the merchant ("Merchant A"), but an indication that the authentication comes via the trusted intermediary. In this embodiment this is indicated by the merchant name ("Merchant A") being preceded by "TSI:" however any indication may be used. The indication indicates to the trusted intermediary that the authentication is associated with a trusted intermediary, as well as with a merchant payment.

Figure 13E:
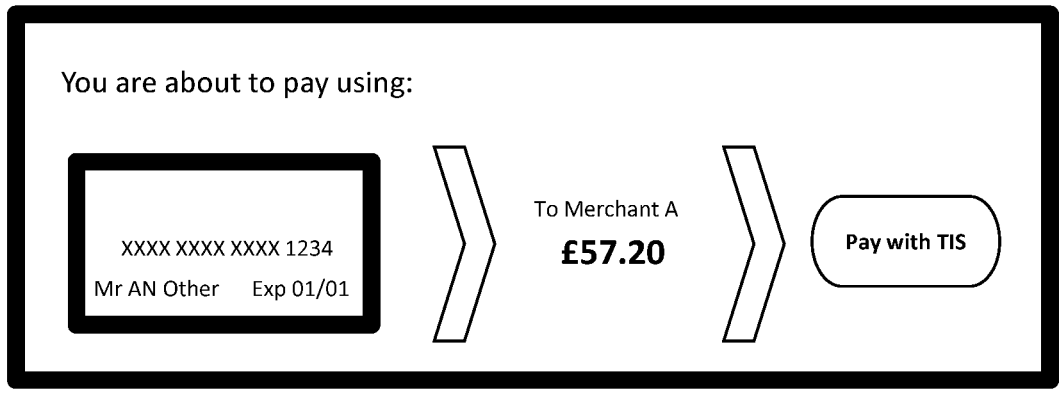
Figure 13F:
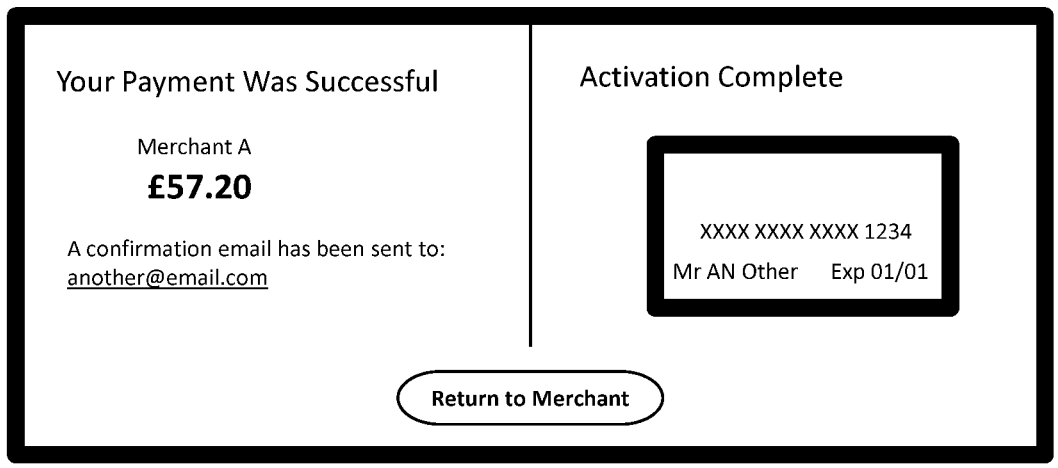

After creation of the digital wallet and activation of the credentials, since a transaction is being conducted along with the activation, in step 8s the trusted intermediary may send to the user system U1 a final confirmation message, requesting final confirmation that the payment is to be made. An example of such a screen is shown in FIG. 13e. The user may then confirm the payment, as shown by step 8t. After which a confirmation may be sent to the user system as shown by FIG. 13f and in step 8u. This confirmation may correspond to the confirmation sent in step 2s above, and may be followed by equivalents of steps 2t to 2w.

Use of the Authentication at the Issuing Bank

The above embodiments have been described as using an authentication process conducted by the issuing bank, which may also be used for a transaction. In such cases, the trusted intermediary system 4 may wish to indicate to the issuing bank that the authentication is for activation of credentials, and not only a transaction. This may be done by, for example, including in the merchant name, the string "TIS", as described above. However any suitable indication may be used.

This may be advantageous in cases where the transaction is, for example, of a low value, and in which the issuing bank may otherwise operate in accordance with e.g. a rule specifying that authentication is not required for the transaction. In such a scenario the user would not be required to authenticate, and the bank may give approval without any user input. This would be undesirable where the authentication is to be used to activate a digital wallet. Therefore, by providing an indication that the authentication comes via the trusted intermediary, the issuing bank will be able to determine that the transaction needs to be authenticated, thereby overriding conventional security rules (based on e.g. transaction value).

Moreover, by providing such an indication to the issuing bank, the issuing bank may know, if desired, to use a higher level of authentication, i.e. one which would otherwise not be requested for a transaction. Since the authentication is provided by the issuing bank, which is to say that is the authentication is between the issuing bank and the user, the issuing bank may select any authentication mechanism. For example, the issuing bank may require more credentials to be provided by the user, or may require the user to use a onetime passcode to authenticate. Some examples of suitable authentication processes include:

- device-based authentication—data derived from a device the user has possession of (e.g., ID card, security token, software token, phone, or cell phone) and/or data gathered through communication with the user system U1, such as automatic detection of device type, connection or other software or hardware characteristics, or other data derived from communication with the user system U1, e.g. geo-location data derived from the IP address of the user system U1);
- biometric authentication—biometric data derived from the user (e.g., fingerprint or retinal pattern, signature or voice recognition, unique bio-electric signals, or another biometric identifier); and other authentication factors—such as a one-time password (OTP) entered by the user.

Activation of Multiple Financial Instruments

In the above description, multiple financial instruments, i.e. payment cards, could be activated when the user had multiple cards at a given issuing bank. See FIGS. 7a, 11c and 13d for the user being offered the opportunity to select multiple cards for activation. It will be understood that this is possible despite the user only authenticating once. In the case of FIG. 7a, with an online banking system, however in the case of FIGS. 11c and 13d this authentication was performed using a unique identifier associated with one of the plurality of available financial instruments.

This activation of multiple financial instruments may be extended to situations where financial instruments are issued by different institutions (i.e. different issuing banks). In such situations, a directory server or the like may contact a plurality of financial institutions, and retrieve credentials which may be activated for the digital wallet.

In one embodiment, the directory server may take the place of the issuing bank described above. As such, the user may authenticate with the directory server, and the credentials may be retrieved from, or via, the directory server, despite originating with different issuing banks. The directory server may therefore be connected to a plurality of issuing banks so as to be able to retrieve the credentials. The authentication may still be performed using a unique identifier, such as a card number, from one of the sets of credentials.

In the alternative, the user might authenticate using with one issuing bank. Following that, the issuing bank may indicate to the directory server that the user is authenticated, at which point the directory server retrieves the details of multiple sets of credentials for activation.

In either case, the functionality of the directory server may be incorporated into a separate entity, an issuing bank, and/or the trusted intermediary.

Alternative Method for Selecting Activation Mode

In some embodiments, the selection of the activation mode may be made via the user providing appropriate input prior to entering the card number. For example the user may identify the issuing bank associated with their card number, without providing the card number itself. This may subsequently be used to determine the whether the issuing bank supports the provision of user data, and therefore to select an activation mode to use. As such, steps 5b and 5c may be omitted from the method described in FIG. 8 and after the receipt of the user input in step 5c, the trusted intermediary system may then determine whether to use the first activation mode or the second activation mode, depending on whether the identified bank is able to provide credentials. The trusted intermediary may proceed to step 5d for the first activation mode and to step 6c for the second activation mode.

Alternative Systems to Use in Place of Issuing Bank

The above system has been described with an issuing bank providing user data, such as the verification data elements, to the trusted intermediary system. However, an issuing bank may not be the only system which does this. For example, a telecommunications company may store payment data for a user, and may even provide a payment system in which a telephone number is used in place of a card number to authorize payments. As such, a telecommunications service provider data processing system may provide the verification data elements to the trusted intermediary. The unique identifier may, in such cases, be a telephone number.

In further embodiments, the provider of the verification data elements may be a merchant. This may be applicable where the merchant stores details of multiple payment instruments. Accordingly, the stored details may be provided by the merchant to the trusted intermediary. In such cases, the merchant may be provided by the same operator as the trusted intermediary. Therefore, the merchant, upon activation of a set of credentials, may retrieve verification data elements from the merchant's payments system, and may make these details available in a digital wallet for use with other merchants.

Selection of Username

In the description above, a username, such as an email address or telephone number, is generated for the digital wallet by the trusted intermediary system. This process may be adapted for various situations.

For example, in embodiments, the user may be presented with a plurality of usernames. These may include one, or a plurality of email addresses (should the user have multiple email addresses stored in the issuing bank system) and likewise one, or a plurality of telephone numbers. Other usernames, or contact details may be used. Presented with this plurality of potential usernames, the user may be given the opportunity to select one to be used as a username. In the alternative, the user may be allowed to use a plurality, or even all, of the usernames.

In embodiments, the trusted intermediary may check each potential username to determine if it is unique. This may not be the case where the username is already associated with a digital wallet—a user may have multiple digital wallets—or where the username is created from e.g. a first name and surname of the user. In such embodiments, the trusted intermediary may present only those usernames which are not already associated with existing wallets. Alternatively or additionally, the trusted intermediary may modify the generated usernames until a unique username is generated. For example, where the username is generated form a user's name, the trusted intermediary may determine that "johnsmith" is taken, and therefore suggest johnsmith29 or similar. Irrespective, the username(s) will have been generated, at least in part, using the received user data.

Modification of Unique Identifiers

In some embodiments, the card numbers and/or the username for the user may change. To overcome this, the trusted intermediary may store, within a user record, a user record unique identifier which will not be changed and will uniquely identify the user. Therefore the username may be changed, however the account may still be uniquely identified within the trusted intermediary system.

The trusted intermediary system may further store in a user record one or more account unique identifiers, which are associated, at the issuing banks, with accounts. Therefore, even if a card number were to change, the account, linked to the user record by the account unique identifier would still be identifiable by the trusted intermediary system. In this latter case, the trusted intermediary may communicate with the issuing bank to ensure that the card number and/or the verification data elements such as address and security code are correct and up to date.

Alternate Forms for Unique Identifier

While the above description uses a card number (i.e. PAN) or a telephone number as the unique identifier, other unique identifiers may be used. These include (but are not limited to):

an identifier used for a national ID scheme, for example DNI-e in Spain;

an identifier used in a national authentication scheme, for example BankID in the Nordics (which leverages national ID number);

a driving license identifier;

an International Bank Account Number (IBAN) or other bank account information;

online banking credentials, e.g. a customer ID number;

a passport number;

a social security or national insurance number;

an identifier used for government services, for example state benefits or taxes;

a utility account number, such as used for gas, electricity, pay TV or internet access (i.e. ISP account number);

a mobile telephone International Mobile Station Equipment Identity (IMEI);

social media credentials, such as a login name or screen name;

a common token for example an identifier associated with a cross-domain cookie;

a wallet provider embedded identifier, such as an identifier previously provided by a bank or an operator of the intermediary system which may be a code or a unique URL Configuration of the Trusted Intermediary System 4

Figure 14:
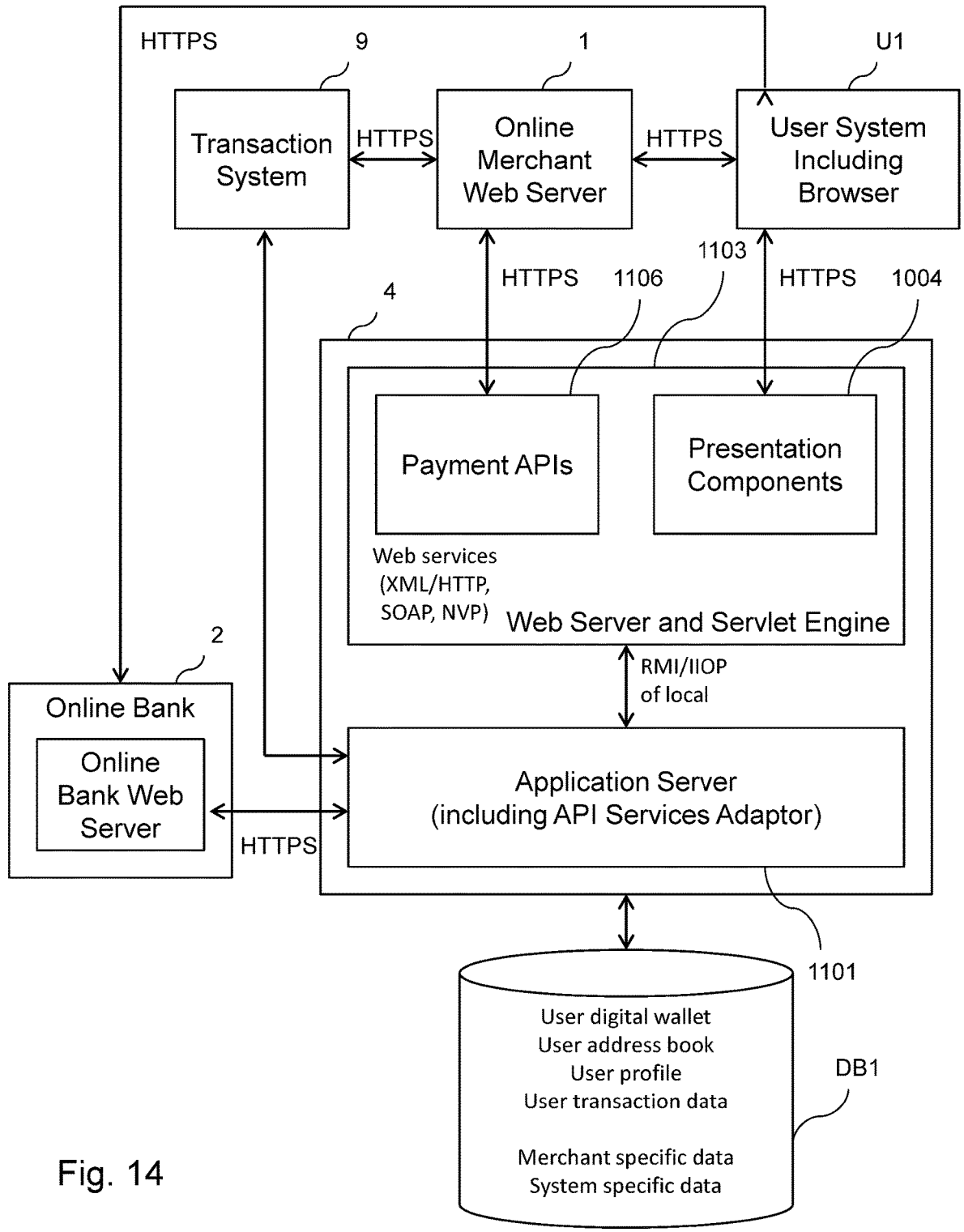
FIG. 14 is a schematic block diagram showing components of the trusted intermediary system in accordance with embodiments.

Details of the configuration and processing capabilities of the trusted intermediary system 4 will now be described with reference to FIG. 14.

The trusted intermediary system 4 may be embodied as a web application server, for example as an application server 1101 which manages and provides access to the common business logic of the trusted intermediary system 4, and a web server and servlet engine 1103, which acts as the entry point for external HTTP requests to the trusted intermediary system 4 from merchants and from users' browsers.

The web server and servlet engine 1103 comprises presentation components 1104 which expose secure web services-based payment APIs or API wrappers 1106 to merchant systems and which are configured to generate and manage the interface to the user system U1, for example when the user wishes to register or selects a payment method in the manner described above.

The trusted intermediary system 4 comprises various other processing components, which are configured to transmit and manage various bank-, user- and merchant-specific data, and will now be described.

Digital Wallet Activation Components and Data

When the user wishes to make use of the digital wallet facility offered by the trusted intermediary system 4, they complete a digital wallet activation process. Activation of the digital wallet held by the trusted intermediary system 4 can be performed via any suitable interface. When the trusted intermediary system 4 is implemented as a web server, activation may be via a web browser. Once registered, each user has an associated user record, which may store demographic identification and/or authentication data for the user as well as activated sets of credentials. This data may be modified via presentation components 1104, while user transaction data and retrieved payment credentials can be displayed for review by the user. In addition, the user may have address book entries, which hold shipping details. These shipping details may be received as one or more of the verification elements, however they may also be manually entered by the user via the presentation components 1104. Where the trusted intermediary system 4 is implemented as a web server, the presentation components 1104 interoperate with the user's browser to allow selection and modification of the credentials and possibly other user data as described above. The presentation components 1104 may also enable the user to select and add to/remove from/edit a list of payment instruments stored in the user's digital wallet.

User Authentication Components

Authentication of a user for using their digital wallet may be performed directly with the trusted intermediary system 4 using, for example, 1-factor authentication—data the user knows (e.g., a username and password, pass phrase, or personal identification number (PIN)). More advanced, i.e. two or three factor authentication may be used.

Bank Data Store

The trusted intermediary system 4 stores bank identifying information for those issuing banks that have signed up to the digital wallet service. For each listed issuing bank, the database DB1 holds data identifying a URL corresponding to their online banking login page. The bank identifying information may contain data on the range or card numbers associated with the bank. For example, the first six digits of a typical card number form an issuer identification number. Therefore the bank identifying data may contain data linking the issuing banks the issuer identification numbers used by the bank.

Application Programming Interfaces (API) Services Adaptor

The trusted intermediary system 4 comprises an API services adaptor, which enables connectivity between the trusted intermediary system 4 and the messaging infrastructure of the overall system 10. The adaptor is configured to manage the fulfilment of the trusted intermediary system 4 requests to external services, such as payment authorizations to the transaction system 9 and to expose a set of trusted intermediary system 4 services that could be used by external functions such as the transaction system 9.

Transaction-Specific Components and Data

The trusted intermediary system 4 may store transactional data such as payment authorizations and settlements that are managed by the trusted intermediary system 4. In addition, the trusted intermediary system 4 can store audit data associated with merchant online activity as well as general system activity.

Messaging Services

The trusted intermediary system 4 may be configured with email agents, which compose and transmit emails for the purposes of email address authentication and user activation and purchase order confirmations. The trusted intermediary system 4 may also be configured with an SMS gateway or other PUSH service interfaces for notifications (for example to an Apple Push Notification Services (APNS) server).

Embodiments described above enables the user to select a payment method on a per transaction basis, whilst removing the requirement for the user to provide payment details to individual merchants. Thus, provided merchants subscribe to the trusted intermediary system 4, users only need allow retrieval of, or submit, their respective payment details once, to a single entity. This has the benefit of reducing the risk of fraud that may be incurred in relation to conventional payment systems that require the user to enter their card payment details via the merchant's system.

The above embodiments are to be understood as illustrative examples of the invention. Further embodiments are envisaged.

In embodiments described above, the authentication mechanisms used for payment transactions involving merchants, it is envisaged that issuing bank-based authentication mechanisms may be used when a user wishes to use their digital wallet, provided by the trusted intermediary system, to initiate a person-to-person payment, and may also be used when the user wishes to change certain predetermined profile contact details relating to the user record at the trusted intermediary system, including for example the registered email address and/or the registered mobile phone number used for step-up authentication.

In the embodiments described above, the registration requirements and authentication strength or process can be altered depending on information available to the trusted intermediary system 4 about the user, the user's device, the browser used by the user and the connection used by the user (e.g. the user's IP address) to ensure that risk of fraudulent activity is reduced. Thus, in addition to the above processes, supplemental additional risk assessment based on automatically collated data about device, user, connection or browser can be employed by the trusted intermediary system 4 to make a decision on increasing or decreasing the registration data requirements or the strength of authentication.

While the above has been described in terms of an entity, such as an intermediary system, performing certain steps, it will be appreciated that embodiments may be practiced by any suitably configured apparatus of system. In particular, in some embodiments there may be provided apparatus comprising at least one processor and at least one memory including computer program instructions, where the at least one memory and the computer program instructions are configured to, with the at least one processor, cause the apparatus at least to perform one or more of steps described above. In other embodiments, there may be provided a computer program product comprising a non-transitory computer-readable storage medium having computer readable instructions stored thereon, the computer readable instructions being executable by a computerized device to cause the computerized device to perform one or more of the steps above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus for transmitting credentials to a transaction processing system via a data communications network, the credentials being arranged in sets of credentials, a set of credentials including an account number and one or more verification data elements associated with the account number, wherein the apparatus comprises a processor and a computer readable medium coupled to the processor, wherein the computer readable medium comprises instructions, which when executed by the processor, cause the processor to request and receive user input including the account number from a user;

determine a trusted data processing system using the account number, the trusted data processing system being an issuing bank data processing system operated by an issuing bank that issued the account number;

determine, using the account number, whether the trusted data processing system is able to provide one or more verification data elements associated with the account number, and select a first activation mode for the account number if the trusted data processing system is unable to provide the one or more verification data elements or a second activation mode for the account number if the trusted data processing system is able to provide the one or more verification data elements;

and in the first activation mode:

request and receive additional user input for the one or more verification data elements associated with the account number from the user; and responsive to the user input, activate a set of credentials including the input account number and the input one or more verification data elements associated with the account number, and in the second activation mode:

initiate an authentication process for the user; and responsive to the user successfully authenticating during the authentication process, request the one or more verification data elements from the trusted data processing system remote from the user and the apparatus, receive the one or more verification data elements from the trusted data processing system, and activate a set of credentials including the input account number and the one or more verification data elements associated with the account number, wherein the instructions further cause the processor, in the second activation mode, to transmit the activated set of credentials to the transaction processing system to complete a payment transaction with the trusted data processing system, which authorizes the payment transaction, and wherein the one or more verification data elements comprises one or more of a password, complex alphanumeric strings which are generated using signing or hash functions, a name, an address, one or more elements of a billing address; a shipping name, one or more elements of a shipping address, an email address, a telephone number, a card security code (CSC), card verification data (CVD), a card verification value (CVV or CVV2), a card verification value code (CVVC), a card verification code (CVC or CVC2), a verification code (V-code or V code), a card code verification (CCV), a signature panel code (SPC), a start date for a financial instrument, and/or an expiry date for a financial instrument, wherein the apparatus is a digital wallet server.

2. The apparatus of claim 1, wherein the instructions cause the processor to communicate with a plurality of trusted data processing systems, each responsible for providing verification data elements associated with different account numbers.

3. The apparatus of claim 1, wherein the instructions cause the processor to store a plurality of user records including a user record being associated with one or more sets of credentials.

4. The apparatus of claim 3, wherein the instructions cause the processor to store, in the user record, the account number within the set of credentials.

5. The apparatus of claim 3, wherein the instructions cause the processor to store, in the user record, the account number and the one or more verification data elements within the activated set of credentials.

6. The apparatus of claim 3, wherein the user record is associated with a plurality of sets of credentials.

7. The apparatus of claim 3, wherein the user record is associated with a username and password, which are used by the apparatus to authenticate the user in a transaction, and wherein the apparatus is configured to generate the username based on data received via a data communications network from the trusted data processing system remote from the user.

8. The apparatus of claim 7, wherein the generated username is different than the account number associated with the activated set of credentials.

9. The apparatus of claim 1, wherein the authentication process is initiated between the user and the trusted data processing system.

10. The apparatus of claim 1, wherein the account number comprises a Primary Account Number (PAN).

11. The apparatus of claim 1, wherein the trusted data processing system comprises an issuing bank data processing system.

12. The apparatus of claim 11, wherein the authentication process is initiated between the user and the issuing bank data processing system.

13. The apparatus of claim 11, wherein the request for the account number from the user is made as a part of the payment transaction.

14. The apparatus of claim 13, wherein the authentication process between the user and the issuing bank data processing system is a payment related authentication process.

15. A non-transitory computer-readable medium having instructions stored thereon that, when executed by a processor of an apparatus, cause the apparatus to perform a method of activating a set of credentials for transmission to a transaction processing system via a data communications network, the credentials being arranged in sets of credentials, a set of credentials including an account number and one or more verification data elements associated with the account number, wherein the method comprises:

requesting and receiving, by the apparatus, user input for the account number from a user, determining, by the apparatus, a trusted data processing system using the account number, the trusted data processing system being an issuing bank data processing system operated by an issuing bank that issued the account number;

determining, by the apparatus and using the account number, whether the trusted data processing system is able to provide one or more verification data elements associated with the account number, and based on the determining, selecting a first activation mode for the account number if the trusted data processing system is unable to provide the one or more verification data elements or a second activation mode for the account number if the trusted data processing system is able to provide the one or more verification data elements;

wherein, in the first activation mode, the method comprises:

requesting additional user input for the one or more verification data elements associated with the account number from the user; and responsive to the user input, activating a set of credentials including the input account number and the input one or more verification data elements associated with the account number, and wherein, in the second activation mode, the method comprises:

initiating an authentication process for the user; and responsive to the user successfully authenticating during the authentication process, requesting the one or more verification data elements from the trusted data processing system remote from the user, receiving the one or more verification data elements from the trusted data processing system via the data communications network, activating the set of credentials including the input account number and the one or more verification data elements associated with the account number, and transmitting the activated set of credentials to the transaction processing system to complete a payment transaction with the trusted data processing system, which authorizes the payment transaction, and wherein the one or more verification data elements comprises one or more of a password, complex alphanumeric strings which are generated using signing or hash functions, a name, an address, one or more elements of a billing address; a shipping name, one or more elements of a shipping address, an email address, a telephone number, a card security code (CSC), card verification data (CVD), a card verification value (CVV or CVV2), a card verification value code (CVVC), a card verification code (CVC or CVC2), a verification code (V-code or V code), a card code verification (CCV), a signature panel code (SPC), a start date for a financial instrument, and/or an expiry date for a financial instrument, wherein the apparatus is a digital wallet server.

16. The computer readable medium of claim 15, wherein the one or more verification data elements includes the address, the address being of the user of the set of credentials.

17. The computer readable medium of claim 15, wherein the one or more verification data elements comprise the card verification value and the expiry date.

18. The computer readable medium of claim 17, wherein the account number is a primary account number associated with a credit or debit card that was previously issued by an issuer.

19. The computer readable medium of claim 18, wherein activating the set of credentials activates the set of credentials for a wallet maintained by the digital wallet server.

20. The computer readable medium of claim 18, wherein the method further comprises:

selecting the second activation mode, and wherein requesting the one or more verification data elements from the trusted data processing system remote from the user, and receiving the one or more verification data elements from the trusted data processing system via the data communications network comprises directly requesting the one or more verification data elements from the trusted data processing system remote from the user, and directly receiving the one or more verification data elements from the trusted data processing system via the data communications network.

* * * * *